United States Patent
Tashiro et al.

(10) Patent No.: US 11,059,317 B2
(45) Date of Patent: Jul. 13, 2021

(54) DISPLAY

(71) Applicant: TOPPAN PRINTING CO., LTD., Tokyo (JP)

(72) Inventors: Tomoko Tashiro, Tokyo (JP); Toshiki Toda, Tokyo (JP); Keitaro Sugihara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 95 days.

(21) Appl. No.: 16/212,492

(22) Filed: Dec. 6, 2018

(65) Prior Publication Data
US 2019/0105939 A1    Apr. 11, 2019

Related U.S. Application Data

(63) Continuation of application No. PCT/JP2017/021381, filed on Jun. 8, 2017.

(30) Foreign Application Priority Data

Jun. 8, 2016 (JP) .............................. JP2016-114754
Jun. 13, 2016 (JP) .............................. JP2016-117275

(51) Int. Cl.
*B42D 25/328* (2014.01)
*G02B 5/18* (2006.01)

(52) U.S. Cl.
CPC ............. *B42D 25/328* (2014.10); *G02B 5/18* (2013.01); *G02B 5/1842* (2013.01)

(58) Field of Classification Search
CPC ....... B42D 25/328; G02B 5/18; G02B 5/1842
See application file for complete search history.

(56) References Cited

U.S. PATENT DOCUMENTS

| 8,445,937 B2 | 5/2013 | Carcia et al. |
| 2008/0258456 A1 | 10/2008 | Rahm et al. |
| 2009/0237800 A1 | 9/2009 | Nakamura et al. |

FOREIGN PATENT DOCUMENTS

| JP | H07-239408 A | 9/1995 |
| JP | 2007-516347 A | 6/2007 |
| JP | 2009-223181 A | 10/2009 |

OTHER PUBLICATIONS

International Search Report with English language translation and Written Opinion issued in International Application No. PCT/JP2017/021381 dated Sep. 5, 2017.

*Primary Examiner* — Kimberly N. Kakalec
(74) *Attorney, Agent, or Firm* — Foley & Lardner LLP

(57) ABSTRACT

A display includes a plurality of pixels arranged in matrix. Each of the pixels includes a single reflecting surface, and all the reflecting surfaces include a set of the reflecting surfaces that allow light incident in a predetermined direction to be reflected in a direction predefined for the respective reflecting surfaces, so that light reflected by all the reflecting surfaces forms an image which appears in a specific direction, which is a direction common to all the reflecting surfaces.

4 Claims, 14 Drawing Sheets

DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/021381, filed on Jun. 8, 2017, which is based upon and claims the benefit of priority to Japanese Patent Applications No. JP2016-114754, filed on Jun. 8, 2016 and No. JP2016-117275, filed Jun. 13, 2016, the disclosures of which are all hereby incorporated herein by reference in their entireties.

TECHNICAL FIELD

The present invention relates to displays having a plurality of pixels.

BACKGROUND ART

Anti-counterfeiting techniques are required for various articles such as authentication documents, negotiable securities, and banknotes. Examples of anti-counterfeiting techniques include attaching an anti-counterfeiting display to an article (for example, PTL 1).

CITATION LIST

[Patent Literature] PTL 1: JP2007-516347 A

SUMMARY OF THE INVENTION

Technical Problem

In order to develop a structure for preventing forgery, techniques for analyzing such displays have been developed. Further, in order to produce structures for preventing forgery, techniques for manufacturing displays have been diversified. However, improvement in the techniques for analyzing displays leads to facilitation of analysis of displays, for the purpose of counterfeiting displays. Further, diversification of techniques for manufacturing displays also facilitates manufacturing of counterfeit products. In such circumstances, new structures for elements constituting displays have been strongly required more than ever. In particular, techniques for improving the designability of displays are required.

An object of the present invention is to provide a display having improved designability.

Solution to the Problem

A display for solving the above problem includes a plurality of pixels arrayed in a matrix, wherein each of the pixels has a pixel unit, and the pixel unit has a single unit reflecting surface. All the unit reflecting surfaces include the unit reflecting surfaces that allow light incident in a predetermined direction to be reflected to a direction predefined for the respective unit reflecting surfaces, so that light reflected by all the unit reflecting surfaces forms an image which appears in a specific direction, which is a direction common to all the reflecting surfaces.

According to the above configuration, the respective image elements that form an image are displayed by reflection on the unit reflecting surfaces, each of which is provided for the respective image elements, and the unit reflecting surfaces, each of which are provided for the respective pixels, are positioned in matrix. Accordingly, the shape of the reflecting surface can be directly determined based on the image data, which is the data determining the brightness of the respective pixels. As a result, since the image displayed by the display can be directly determined by the image data, the designability of the display can be improved.

In the above display, at least one of the unit reflecting surfaces may include a plurality of first surface elements which are arranged spaced from each other in a first phantom plane.

According to the above configuration, since the unit reflecting surface which includes the plurality of first surface elements is included in the pixels, the unit reflecting surfaces for displaying an image can be provided with a complicated structure to thereby enhance anti-counterfeiting measures for the display.

In the above display, the plurality of first surface elements may allow light having a wavelength predefined for the unit reflecting surface and incident on the unit reflecting surface in a direction predefined for the unit reflecting surface to be diffracted in the specific direction.

According to the above configuration, light is diffracted in the specific direction, which is the direction in which light is reflected. Accordingly, an image formed by diffracted light can be displayed in the specific direction. Further, since the unit reflecting surfaces, each of which is provided for the respective pixels, include the plurality of first surface elements, an image displayed in the specific direction can also have an improved resolution. Accordingly, the visibility of the image displayed in the specific direction can be improved.

In the above display, the image may be a first image, the unit reflecting surface may be a first unit reflecting surface, and the specific direction may be a first specific direction. Further, among all the pixels, a plurality of superimposed pixels may be included. Here, each of the superimposed pixels may further include a single second unit reflecting surface, and, among all the second unit reflecting surfaces, the second unit reflecting surfaces that allow light incident in a predetermined direction to be reflected to a direction predefined for the respective second unit reflecting surfaces may be included, so that light reflected by all the second unit reflecting surfaces forms an image to be viewed in a second specific direction, which is a direction common to all the second unit reflecting surfaces.

According to the above display, since the respective superimposed pixels of the image elements are responsible for display of image elements forming an image which appears in the first specific direction and display of image elements forming an image which appears in the second specific direction, the designability of the display can be improved.

In the above display, at least one of the second unit reflecting surfaces may include a plurality of second surface elements which are arranged spaced from each other in a second phantom plane, and the plurality of second surface elements may allow light having a wavelength predefined for the second unit reflecting surface and incident on the second unit reflecting surface in a direction predefined for the second unit reflecting surface to be diffracted in the second specific direction.

According to the above configuration, in both the image which appears in the first specific direction and the image which appears in the second specific direction, the resolution of image which appears in the specific direction, and thus the visibility of image which appears in the specific direction, can be improved.

In the above display, all the pixels may be arranged in a matrix in a plane, and, in at least one of the plurality of superimposed pixels, the first unit reflecting surface may include the plurality of first surface elements which are arranged spaced from each other in a first phantom plane, and the second unit reflecting surface may include the plurality of second surface elements which are arranged spaced from each other in a second phantom plane. Further, the first surface elements and the second surface elements may be alternately arranged in an arrangement direction as viewed in a direction facing the plane on which the pixels are arrayed, and a direction in which the first phantom plane is oriented and a direction in which the second phantom plane is oriented may be different from each other.

According to the above configuration, the first surface elements and the second surface elements are alternately arranged in an arrangement direction as viewed in a direction facing the plane on which the pixels are arrayed, while the direction in which the first phantom plane is oriented and the direction in which the second phantom plane is oriented are different from each other. Accordingly, the reflecting surfaces can be provided with a complicated structure to thereby enhance anti-counterfeiting measures for the display.

In the above display, all the pixels may be arranged in a matrix in a plane, and in at least one of the plurality of superimposed pixels, the first unit reflecting surface may include the plurality of first surface elements which are arranged spaced from each other in a first phantom plane, the second unit reflecting surface may include the plurality of second surface elements which are arranged spaced from each other in a second phantom plane, the first surface elements and the second surface elements may be alternately arranged in an arrangement direction as viewed in a direction facing the plane on which the pixels are arrayed, and an angle formed between the plane on which the pixels are arrayed and the first phantom plane and an angle formed between the plane on which the pixels are arrayed and the second phantom plane may be different from each other.

According to the above configuration, the first surface elements and the second surface elements are alternately arranged in an arrangement direction as viewed in a direction facing the plane on which the pixels are arrayed, while an angle formed between the plane on which the pixels are arrayed and the first phantom plane and an angle formed between the plane on which the pixels are arrayed and the second phantom plane may be different from each other. Accordingly, the reflecting surfaces can be provided with a complicated structure to thereby enhance anti-counterfeiting measures for the display.

In the above display, all the pixels may be arranged in a matrix in a plane, and in at least one of the plurality of superimposed pixels, the superimposed pixel may include a bent surface, which is a bent surface formed of two planes and provided for each superimposed pixel, the bent surface being configured such that the two planes intersect with each other by a straight line which crosses the plane on which the pixels are arrayed, one of the planes that form the bent surface may be the first unit reflecting surface, and the other of the planes that form the bent surface may be the second unit reflecting surface.

According to the above configuration, since the first unit reflecting surface and the second unit reflecting surface form a single bent surface for the respective superimposed pixels, the superimposed pixels can be provided with a complicated structure to thereby enhance anti-counterfeiting measures for the display.

A display for solving the above problem includes a plurality of pixels arrayed in matrix, wherein all the pixels include a plurality of first pixels and a plurality of second pixels, each of the first pixels has a pixel unit, and the pixel unit has a single first unit reflecting surface, and all the first unit reflecting surfaces include a plurality of first unit reflecting surfaces that allow light incident in a predetermined direction to be reflected to a direction predefined for the respective first unit reflecting surfaces, so that light reflected by all the first unit reflecting surfaces forms a first image which appears in a first specific direction, which is a direction common to all the first unit reflecting surfaces. Further, each of the second pixels has a pixel unit, and the pixel unit has a single second unit reflecting surface, and all the second unit reflecting surfaces include the second unit reflecting surfaces that allow light incident in a predetermined direction to be reflected to a direction predefined for the respective second unit reflecting surfaces, so that light reflected by all the second unit reflecting surfaces forms a second image which appears in a second specific direction, which is a direction common to all the second unit reflecting surfaces.

According to the above configuration, the respective image elements that form the first image are displayed by reflection on the first unit reflecting surfaces, each of which is provided for the respective image elements, and the first unit reflecting surfaces, each of which is provided for the respective first pixels, are positioned in matrix. Accordingly, the shape of the first unit reflecting surface can be directly determined based on the image data, which is the data determining the brightness of the respective first pixels. Further, the respective image elements that form the second image are displayed by reflection on the second unit reflecting surfaces, each of which is provided for the respective image elements, and the second unit reflecting surfaces, each of which is provided for the respective second pixels, are positioned in matrix. Accordingly, the shape of the second unit reflecting surface can be directly determined based on the image data, which is the data determining the brightness of the respective second pixels. As a result, since the image displayed by the display can be directly determined by the image data, the designability of the display can be improved.

BRIEF DESCRIPTION OF DRAWINGS

FIGS. 7A and 7B are diagrams illustrating an effect of the pixels in a second embodiment, in which FIG. 7A is a side view illustrating a side structure of three continuous pixels, and FIG. 7B is a plan view illustrating a planar structure of three continuous pixels.

DESCRIPTION OF REPRESENTATIVE EMBODIMENTS

Figure 1:
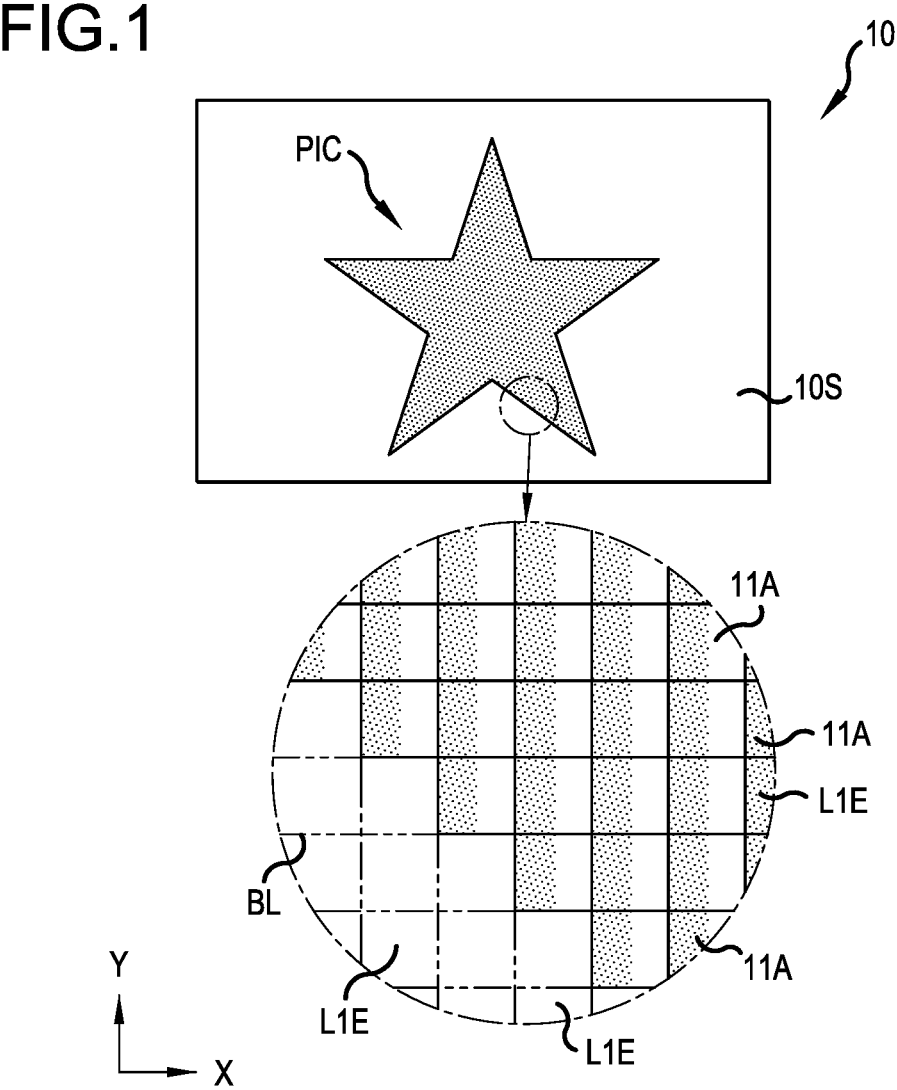
FIG. 1 is a configuration diagram illustrating a configuration of a unit lattice included in a display of a first embodiment.

With reference to the drawings, embodiments of the present invention will be described in detail. It is to be understood that the present invention is not limited to the following embodiments, which are intended to be representative of the present invention. The representative embodiments described below are merely example of the present invention, and the designs thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein.

First Embodiment

Figure 2:
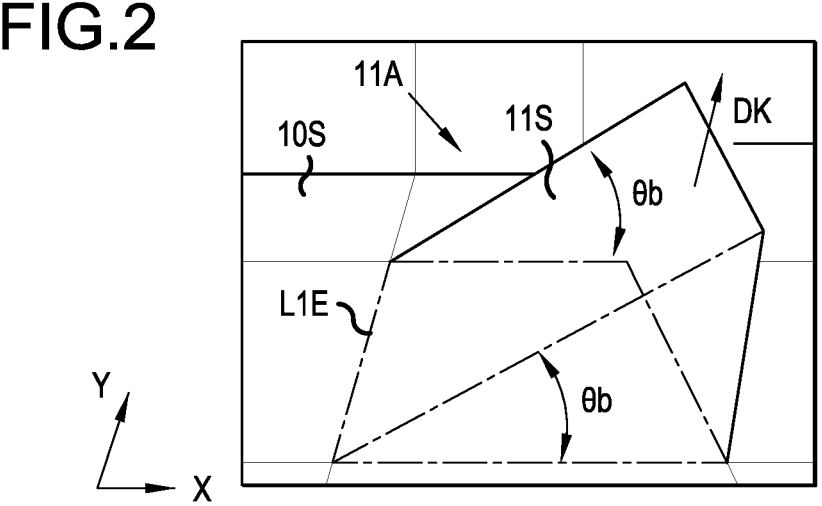
FIG. 2 is a perspective view illustrating a perspective structure of the pixels in the first embodiment.

With reference to FIGS. 1 and 2, a display in a first embodiment will be described.

As shown in FIG. 1, a display 10 includes a display surface 10S on which a plurality of pixels 11A are arrayed. The pixels 11A, among a group of pixels 11G arranged to display an image PIC which appears in a specific direction, are minimum units repeatedly arranged in a matrix array on the display surface 10S to form an independent image. The image PIC shows, for example, text, figure, symbol, design, or the like. The display surface 10S may be a flat surface or a curved surface. The image PIC is created by the group of pixels 11G.

The positions of the pixels 11A are, for example, unit lattices of rectangular lattice, unit lattices of oblique lattice, or unit lattices of rhombic lattice. Further, in the example shown in FIG. 1, the respective pixels 11A are arranged in one direction, an X direction, and in another direction, a Y direction perpendicular to the X direction, such that a star-shaped image PIC appears in a specific direction due to an optical function exhibited by the plurality of pixels 11A. That is, the image PIC is visually recognized in a specific direction. Further, the pixels 11A are shown in gradation such that the smaller the distance to the display surface 10S, the darker the color applied to a surface of the pixel 11A.

The display surface 10S is a surface on which a virtual lattice BL is defined. The lattice BL includes a plurality of unit lattices L1E that occupy a predetermined area on the display surface 10S, and the unit lattices L1E are arrayed in a matrix on the display surface 10S. The unit lattices L1E are minimum units repeatedly arranged in the lattice BL to exhibit an optical function. In the example shown in FIG. 1, a single pixel 11A is positioned in each unit lattice L1E.

As shown in FIG. 2, a single pixel 11A is positioned in each unit lattice L1E, and each pixel 11A includes a single unit reflecting surface 11S. The unit reflecting surface 11S is an optical surface that crosses the display surface 10S such that a tilt angle θb is formed between the unit reflecting surface 11S and the display surface 10S. The respective tilt angles θb are constant in the Y direction. The respective unit reflecting surfaces 11S are mirror surfaces that reflect visible light, and specularly reflect light incident on the unit reflecting surface 11S toward a direction according to the tilt angle θb.

The unit reflecting surface 11S has a shape reflecting incident light on the unit reflecting surface 11S at an incidence angle within a certain range (at a certain range of incidence angle) to be in certain reflection angle range, which includes the reflection angle range in an observation direction, a specific direction DK, common to all the unit reflecting surfaces 11S. The length of the unit reflecting surface 11S in the Y direction is such that diffracted light is emitted in a direction different from the traveling direction of light which has been specularly reflected by the unit reflecting surface 11S. The traveling direction of light which has been diffracted by the unit reflecting surface 11S is a direction closer to the normal direction of the unit reflecting surface 11S than the traveling direction of light which has been specularly reflected. Further, the pixel 11A may be a projection having a triangular prism shape on the display surface 10S, or may be a recess having the unit reflecting surface 11S on the display surface 10S.

The above-mentioned display 10 is produced, for example, by using an original plate. The method for producing the original plate includes applying a photosensitive resist on one surface of the plate-shaped substrate, and then radiating a beam onto the photosensitive resist for exposure and development of part of the photosensitive resist to thereby produce an original plate. Then, a metallic stamper is produced from the original plate by electroplating or the like. The metallic stamper is used as a matrix for replicating the display 10. A metallic stamper may also be produced by cutting a metal substrate by using a lathe technique. The method for producing the display 10 includes producing a molded product, for example, by hot embossing, casting, or a photopolymer method, and then forming a reflection film on the surface of the molded product. In the photopolymer method, a radiation curable resin is introduced into a space between a flat substrate such as a plastic film and a metallic stamper, and the radiation curable resin is hardened by applying radiation. Subsequently, the hardened resin film is removed together with the substrate from the metallic stamper. A photopolymer method is preferred compared with pressing or casting that uses a thermoplastic resin in that pixels 11A with high structural precision as well as high thermal resistance and chemical resistance can be obtained.

According to the first embodiment described above, the following advantageous effects are obtained.

(1) Image elements that form the image PIC are displayed by reflection on the unit reflecting surfaces 11S, each of which is provided for the respective image elements. Since the unit reflecting surfaces 11S, each of which is provided for the respective pixels 11A, are positioned in a matrix, the shape of the unit reflecting surfaces 11S can be directly determined by the image data, which is the data determining the brightness of the respective pixels 11A. As a result, since the image PIC displayed by the display 10 can be directly determined by the image data, the designability of the display 10 can be improved.

(2) Since the diffracted light cannot be easily visually recognized from the specific direction DK, rainbow glitter in the image PIC can be reduced while the luster of the unit reflecting surfaces 11S can be imparted to the image PIC.

The first embodiment described above may be modified and implemented as follows.

[First Modification]

Figure 3:
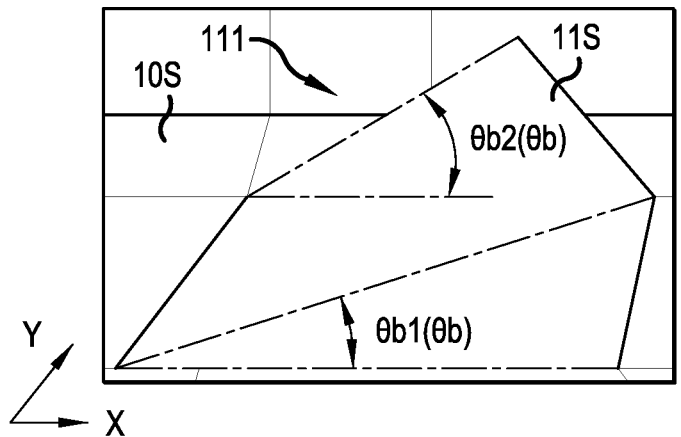
FIG. 3 is a perspective view illustrating a perspective structure of the pixels in a first modification.

The tilt angle θb may not be necessarily constant in the Y direction, and may vary in the Y direction. For example, as shown in FIG. 3, the tilt angle θb1 at the proximal end of the unit reflecting surface 11S in the Y direction is smaller than the tilt angle θb2 at the distal end of the unit reflecting surface 11S in the Y direction. The tilt angle θb of the unit reflecting surface 11S linearly increases from the proximal end to the distal end in the Y direction. The normal direction of the unit reflecting surface 11S is a direction perpendicular to the X direction and the Y direction as viewed in the direction facing the plane including the X direction and the Y direction. On the other hand, the normal direction of the unit reflecting surface 11S in the first embodiment is parallel with the X direction as viewed in the direction facing the plane including the X direction and the Y direction. Therefore, according to pixels 111 of the first modification, a new specific direction DK may be a direction different from the specific direction DK of the pixels 11A in the first embodiment as viewed in the direction facing the display surface 10S, that is, a direction different from the plane direction including the X direction or the plane direction including the Y direction. Further, the tilt angle θb1 may be larger than the tilt angle θb2, and the tilt angle θb of the unit reflecting surface 11S may linearly decrease in the Y direction.

Figure 4:
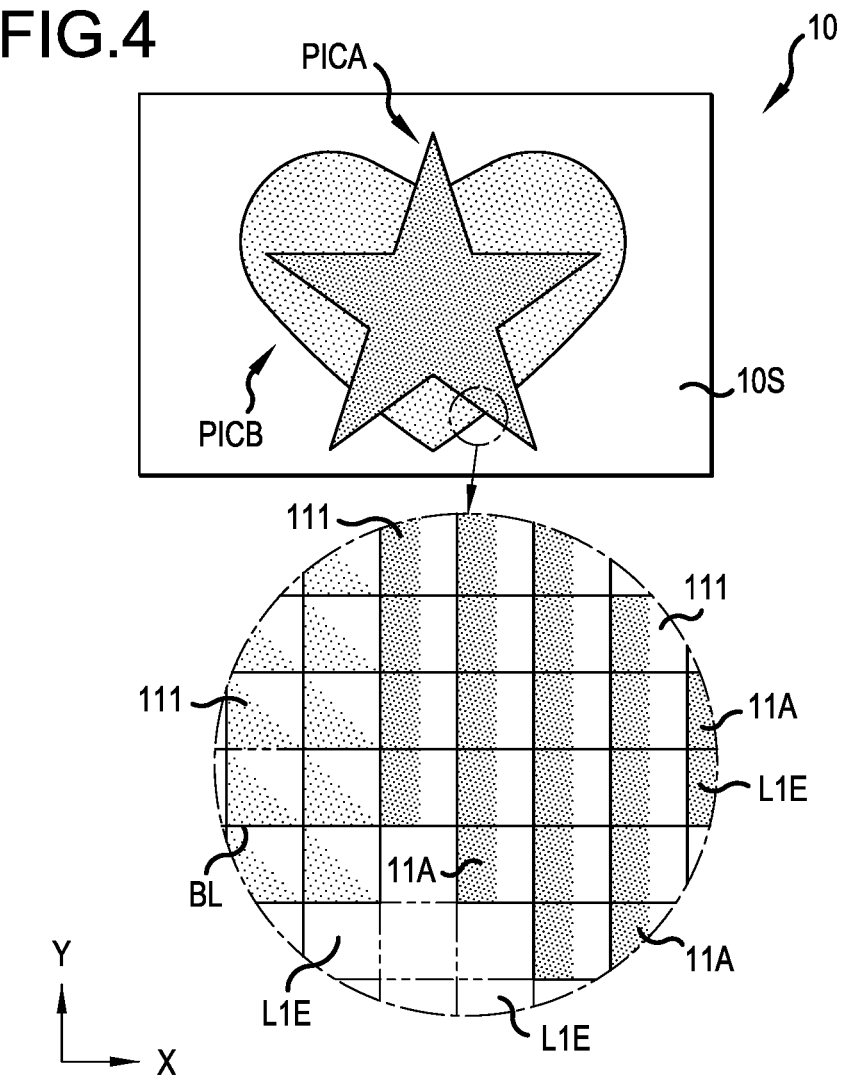
FIG. 4 is a configuration diagram illustrating an arrangement of the pixels included in the display in the first modification.

Further, as shown in FIG. 4, the pixels 11A of the first embodiment and the pixels 111 of the first modification can be appropriately combined when used. In this case, the display 10 may include a region where only the pixels 11A are positioned, a region where only the pixels 111 are positioned, and a region where both are positioned on the display surface 10S. With this configuration, a single display 10 can display an image PICA, which is created by the pixels 11A and appears in the specific direction DK, and an image PICB, which is created by the pixels 111 and appears in the specific direction DK. Furthermore, the unit reflecting surfaces 11S for displaying an image can be provided with a complicated structure to thereby enhance anti-counterfeiting measures for the display 10.

Figure 5:
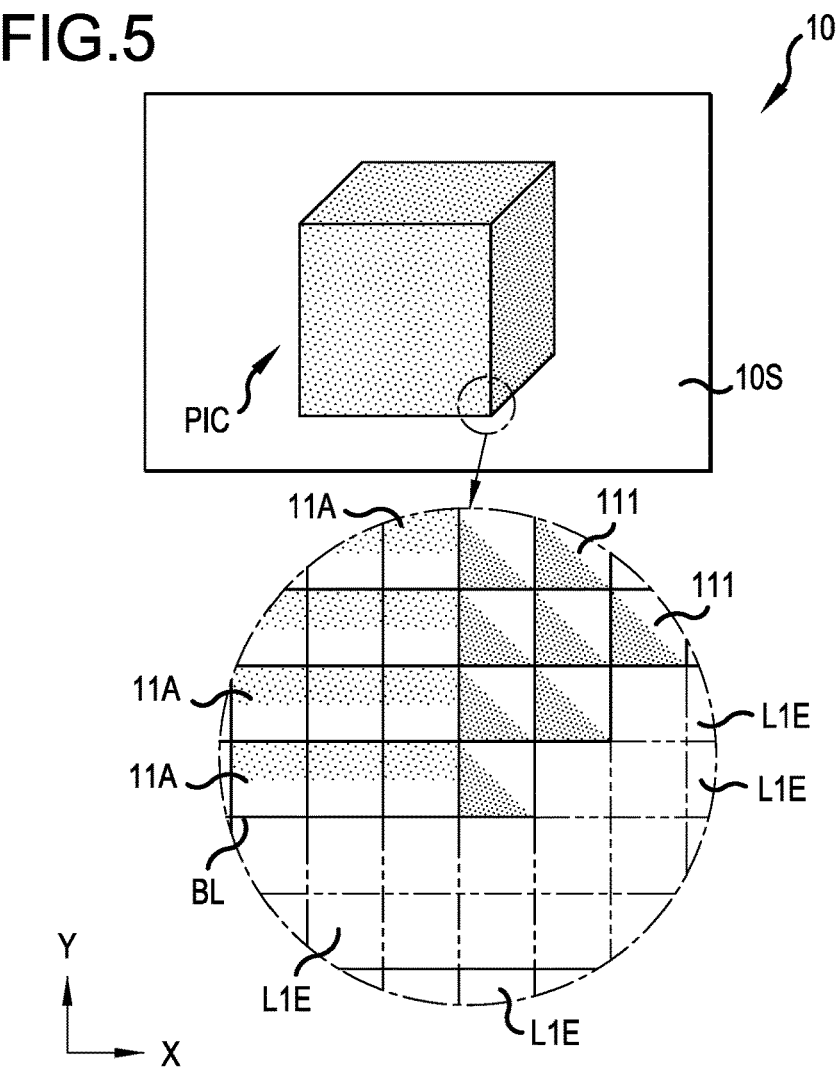
FIG. 5 is a configuration diagram illustrating another arrangement of the pixels included in the display in the first modification.

Further, as shown in FIG. 5, the pixels 11A and the pixels 111 may be positioned on mutually different sides of a three-dimensional geometric structure shown in the image PIC. Here, it is preferred that the direction to which each side of the three-dimensional geometric structure is oriented is similar to the direction to which the unit reflecting surface 11S in the same side is oriented. When observed in a direction different from the specific direction DK, the image created by reflection by the pixels 11A and the image created by reflection by the pixels 111 are visually recognized with lower brightness than that in the specific direction DK. With the above configuration, lightness appropriate for each side of the three-dimensional geometric structure in the image PIC can be expressed when viewed in the specific direction DK, which also imparts a three-dimensional appearance to the image PIC.

[Second Modification]

The unit reflecting surface 11S is not limited to a single surface, and can also be implemented as a group of surface elements.

Figure 6:
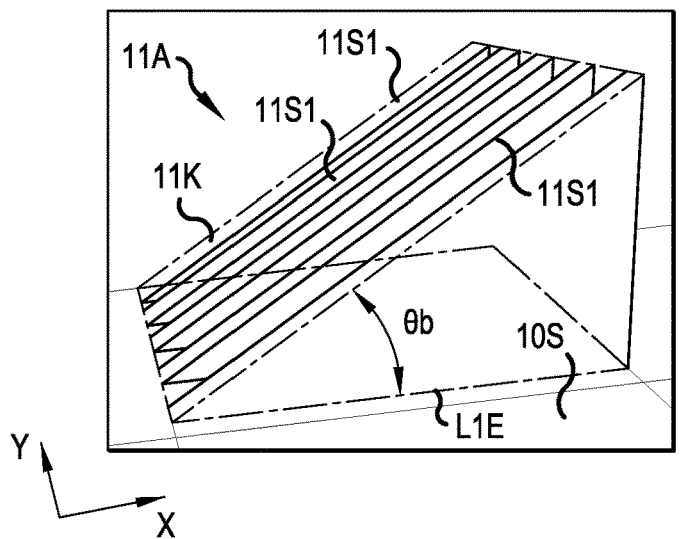
FIG. 6 is a perspective view illustrating a perspective structure of the pixels in a second modification.

For example, as shown in FIG. 6, the pixel 11A includes a plurality of surface elements 11S1 arrayed in a phantom plane 11K. The respective surface elements 11S1 are surfaces each extending in the X direction as viewed in the direction facing the display surface 10S, and are arranged spaced from each other in the Y direction, which is an array direction. The phantom plane 11K, which includes the plurality of surface elements 11S 1, is a phantom plane provided for each pixel 11A, and is each included in the respective unit lattices L1E. An angle formed between the display surface 10S and the phantom plane 11K is the tilt angle θb. That is, every angle formed between the display surface 10S and the respective surface elements 11S1 is the same tilt angle θb. The surface elements 11S1 are optical surfaces that cross the display surface 10S, and the tilt angles θb are constant in the Y direction. In this configuration, the length of the phantom plane 11K in the Y direction may be substantially the same as the length of the unit reflecting surface 11S in the Y direction in the first embodiment, or may be such that diffracted light is emitted in the traveling direction of light which has been specularly reflected.

Second Embodiment

Figure 7A:
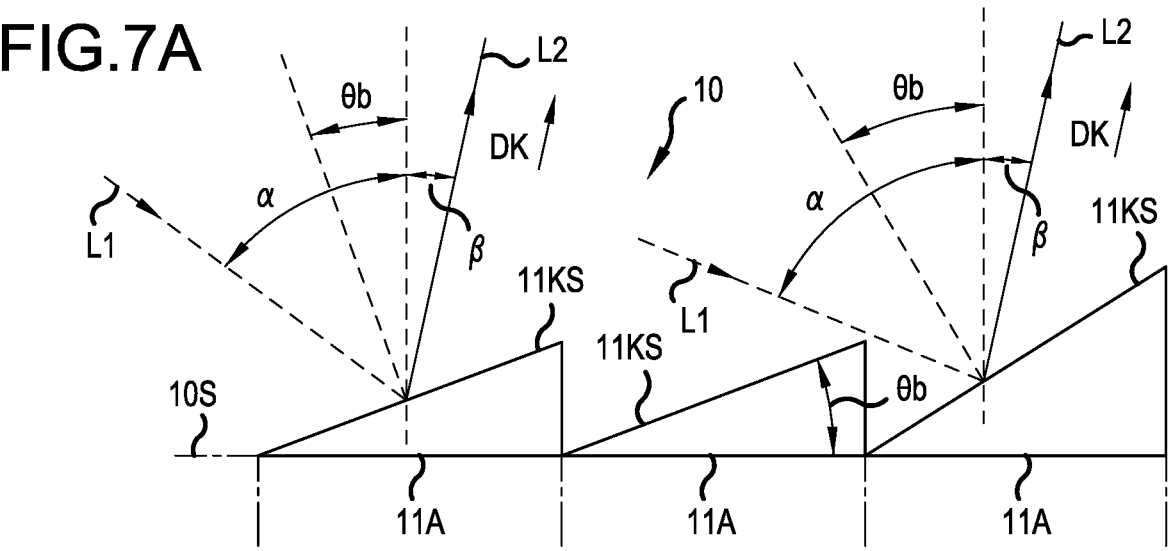
Figure 7B:
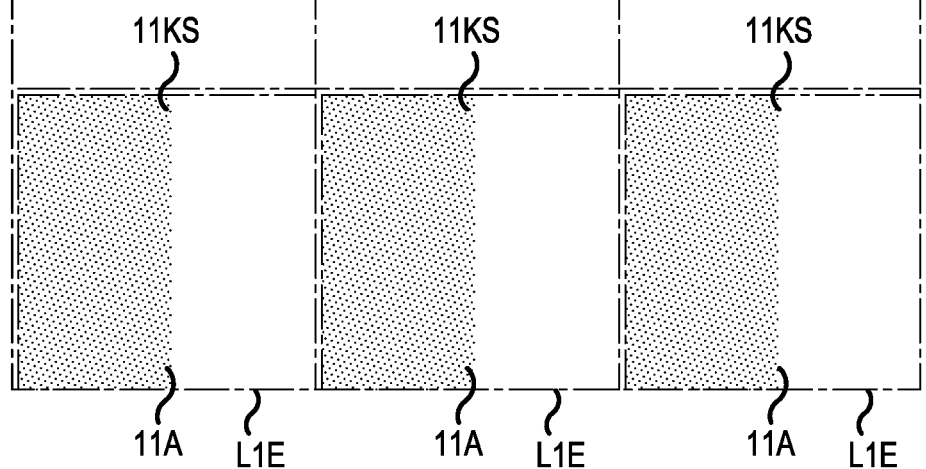
Figure 11:
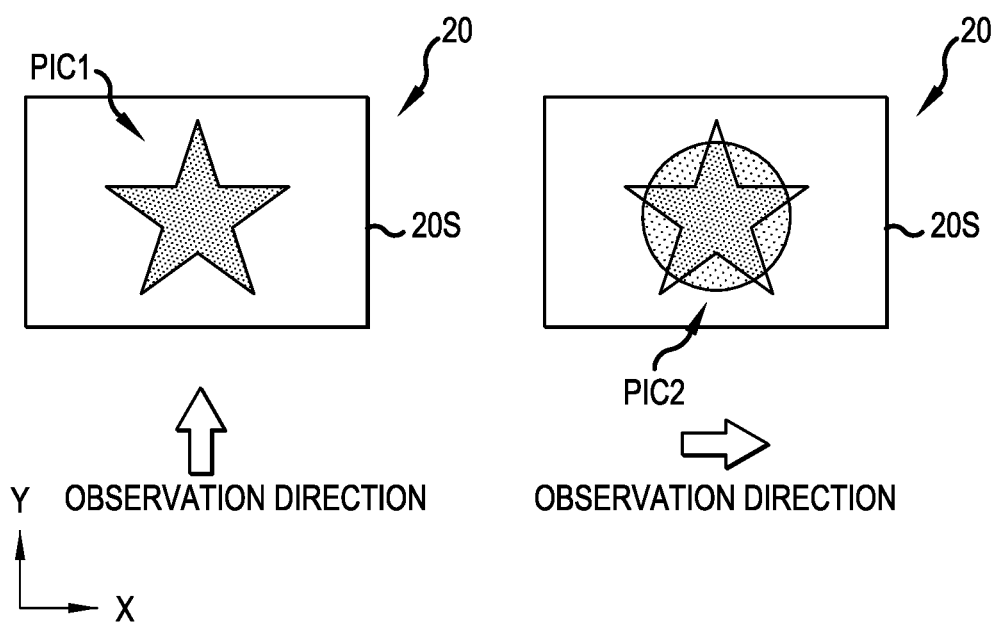
FIG. 11 is a diagram illustrating an effect of the display in the second embodiment.

With reference to FIGS. 7A, 7B, to 11, a display of a second embodiment will be described. First, with reference to FIGS. 7A and 7B, diffraction, which is an example of a function of the reflecting surface in the second embodiment, will be described. It should be noted that the reflecting surface of the second embodiment may also be configured not to have a diffraction function.

Further, in FIG. 7B, virtual reflecting surfaces 11KS are shown in gradation such that a portion of the virtual reflecting surface 11KS having a larger distance to the display surface 10S is shown closer to white and a portion of the virtual reflecting surface 11KS having a smaller distance to the display surface 10S is shown closer to black.

As shown in FIG. 7A, a pitch of the reflecting surfaces 11KS in the arrangement direction of the virtual reflecting surfaces 11KS is set as follows. That is, the pitch of the reflecting surfaces 11KS is set such that the traveling direction of light which has been specularly reflected by the virtual reflecting surface 11KS is consistent with the traveling direction of an m-order (m is an integer 1 or higher) diffracted light L2 having a specific wavelength $\lambda$ generated by the virtual reflecting surface 11KS. Here, the traveling direction of the m-order diffracted light L2 is the aforementioned specific direction DK. The unit reflecting surface 11S may be a flat surface having the tilt angle $\theta b$, or may be a curved surface which is optically regarded as a plane having the tilt angle $\theta b$.

Specifically, an angle formed between the traveling direction of the incident light L1 which is incident on the unit reflecting surface 11S and the normal direction to the display surface 10S is an incidence angle $\alpha$. An angle formed between the traveling direction of the m-order diffracted light L2 and the normal direction to the display surface 10S is a diffraction angle $\beta$. When the wavelength of the diffracted light L2 generated by the pixel 11A is the specific wavelength $\lambda$, the diffraction angle $\beta$ is common to all the unit reflecting surfaces 11S, and the incidence angle $\alpha$, the diffraction angle $\beta$, the specific wavelength $\lambda$ and the tilt angle $\theta b$ satisfy the following formulae (1) and (2).

$$\sin \alpha + \sin \beta = m\lambda \ (m \text{ is an integer 1 or higher}) \quad (1)$$

$$\theta b = (\alpha - \beta)/2 \quad (2)$$

The unit reflecting surface 11S having the above tilt angle $\theta b$ exhibits high diffraction efficiency for the m-order diffracted light L2 having the specific wavelength $\lambda$. For example, the unit reflecting surface 11S converts white incident light L1 into colored light in the specific direction DK with high conversion efficiency. Further, since the respective pixels 11A include a single unit reflecting surface 11S, an image displayed in the specific direction DK can also have an improved resolution. As a result, an image can be displayed in the specific direction DK with an improved diffraction efficiency, and thus the visibility of the image displayed in the specific direction DK can be improved.

As shown in FIG. 6 when the display 10 is configured to include the plurality of unit reflecting surfaces 11S having mutually different tilt angles $\theta b$, the diffracted lights L2 having mutually different specific wavelengths $\lambda$ are reflected by the respective pixels 11A into a common specific direction DK. Accordingly, the display 10 can create a color image appearing in the specific direction DK.

Figure 8:
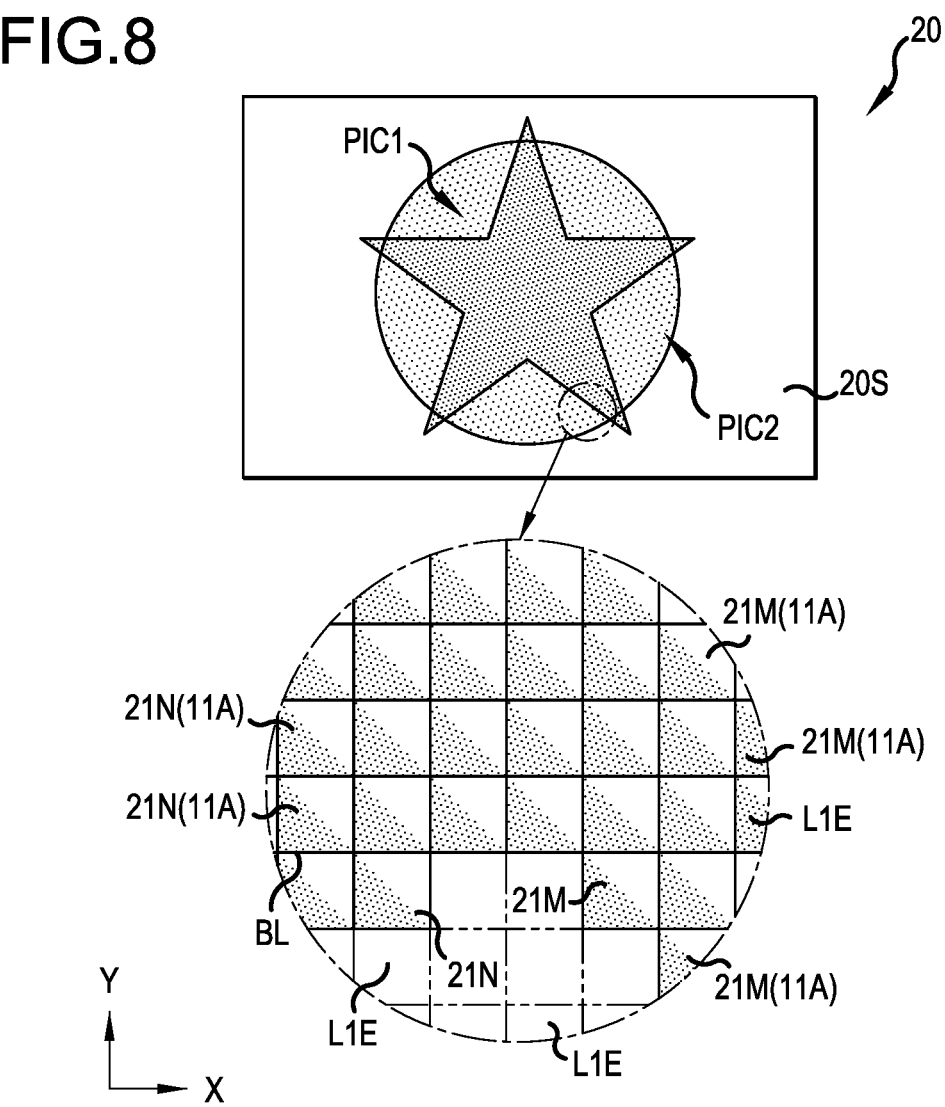
FIG. 8 is a plan view illustrating a planar structure of the display in the second embodiment.

As shown in FIG. 8, a display 20 includes a display surface 20S on which the plurality of pixels 11A are arrayed. The group of pixels 11G, composed of the plurality of pixel 11A, include a plurality of superimposed pixels 21M and a plurality of single-plane pixels 21N. Since the single-plane pixels 21N have the same configuration as that of the pixels 11A described in the first embodiment and the modification thereof, duplicated description will be omitted and the superimposed pixels 21M will be described in detail. Further, the aforementioned specific direction DK, which is a direction in which the diffracted light L2 travels from the single-plane pixel 21N is a second specific direction.

The respective superimposed pixels 21M are arrayed in a matrix on the display surface 20S. The superimposed pixels 21M are minimum units repeatedly arranged in a structure for displaying images in a second specific direction and a first specific direction, which is a specific direction different from the second specific direction, to form an independent image. The first image PIC1 displayed by the plurality of superimposed pixels 21M is, for example, text, figure, symbol, design, or the like. The positions of the superimposed pixels 21M are, for example, unit lattices of rectangular lattice, unit lattices of oblique lattice, or unit lattices of rhombic lattice. The positions of the superimposed pixels 21M are on the lattice that is common to the lattice BL in which the single-plane pixels 21N are positioned, and are unit lattices different from the positions of the single-plane pixels 21N. Further, in the example shown in FIG. 8, the respective superimposed pixels 21M and the respective single-plane pixels 21N are arranged in one direction, the X direction, and in another direction perpendicular to the X direction, the Y direction.

A star-shaped first image PIC1 appears in a first specific direction due to an optical function exhibited by the plurality of superimposed pixels 21M. Further, a new image in which an image similar to the star-shaped first image PIC1 is superimposed on a circular superimposed image PIC2 appears in a second specific direction due to an optical function exhibited by the plurality of superimposed pixels 21M and an optical function exhibited by the plurality of single-plane pixels 21N. The first image PIC1 and the superimposed image PIC2 are created by the group of pixels 11G.

As with the first embodiment, the display surface 20S is a surface on which the virtual lattice BL is defined. The unit lattices L1E are minimum units repeatedly arranged in the lattice BL to exhibit an optical function. In the example shown in FIG. 8, a single pixel 11A is positioned in each unit lattice L1E.

Figure 9:
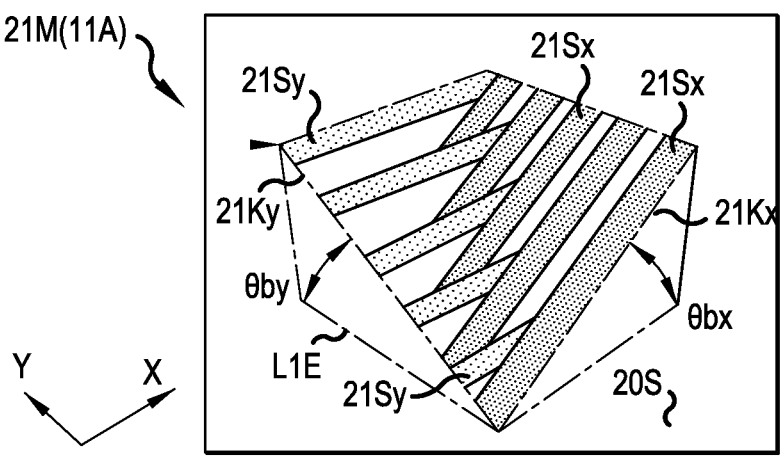
FIG. 9 is a perspective view illustrating a perspective structure of the pixels in the second embodiment.

As shown in FIG. 9, the superimposed pixel 21M includes a plurality of first surface elements 21Sx. The plurality of first surface elements 21Sx are arranged in a single first phantom plane 21Kx. Further, the superimposed pixel 21M includes a plurality of second surface elements 21Sy. The plurality of second surface elements 21Sy are arranged in a second phantom plane 21Ky. The respective first surface elements 21Sx and the respective second surface elements 21Sy are the surfaces each extending in the X direction as viewed in the direction facing the display surface 20S, and are alternately arranged in the Y direction, which is an array direction.

The first phantom plane 21Kx, which includes the plurality of first surface elements 21Sx, is a phantom plane provided for each superimposed pixel 21M, and is included in each of the respective unit lattices L1E. An angle formed between the display surface 10S and the first phantom plane 21Kx is a first tilt angle $\theta bx$. That is, every angle formed between the display surface 20S and the respective first surface elements 21Sx is the first tilt angle $\theta bx$. The first surface elements 21Sx are optical surfaces that cross the display surface 20S, and the first tilt angles $\theta bx$ are constant in the Y direction. The first tilt angle $\theta bx$ of the first phantom plane 21Kx is set such that the first phantom plane 21Kx is a virtual reflecting surface that satisfies the above formulae (1) and (2).

The second phantom plane 21Ky, which includes the plurality of second surface elements 21Sy, is a phantom plane provided for each superimposed pixel 21M, and is included in each of the respective unit lattices L1E. An angle formed between the display surface 10S and the second phantom plane 21Ky is a second tilt angle θby. That is, every angle formed between the display surface 20S and the respective second surface elements 21Sy is the second tilt angle θby. The second surface element 21Sy are optical surfaces that cross the display surface 20S, and the second tilt angles θby are constant in the X direction. The second tilt angle θby of the second phantom plane 21Ky is set such that the second phantom plane 21Ky is a virtual reflecting surface that satisfies the above formulae (1) and (2).

When viewed in the direction facing the display surface 20S, the normal direction of the first phantom plane 21Kx is a direction to which the first phantom plane 21Kx is oriented. When viewed in the direction facing the display surface 20S, the normal direction of the second phantom plane 21Ky is a direction to which the second phantom plane 21Ky is oriented. The first tilt angle θbx and the second tilt angle θby may be equal to or different from each other. On the other hand, the direction to which the first phantom plane 21Kx is oriented and the direction to which the second phantom plane 21Ky is oriented are different from each other. The direction to which the second phantom plane 21Ky is oriented is the same as the direction to which the unit reflecting surfaces 11S of the single-plane pixel 21N are oriented.

All the first surface elements 21Sx included in the first phantom plane 21Kx cooperate with each other to exhibit the optical functions as described below. That is, light incident on the first phantom plane 21Kx in the direction predefined for the first phantom plane 21Kx and having a wavelength predefined for the first phantom plane 21Kx is reflected by the respective first surface elements 21Sx. Here, all the first surface elements 21Sx included in the first phantom plane 21Kx diffract light in the second specific direction, which is a direction in which the light described above is reflected and which is common to the respective first phantom planes 21Kx. In other words, all the first surface elements 21Sx included in the first phantom plane 21Kx cooperate with each other to exhibit the same functions as that of the unit reflecting surface 11S, which is described above in connection with the first embodiment, in the second specific direction.

Further, the first surface elements 21Sx of the respective superimposed pixels 21M may generate diffracted light having the same color or may generate diffracted light having different colors. When the first surface elements 21Sx of the respective superimposed pixels 21M generate diffracted light having the same color, the display 10 generates a monochrome image which appears in the first specific direction. When the first surface elements 21Sx of the respective superimposed pixels 21M generate diffracted light having different colors, the display 20 generates a color image which appears in the first specific direction. Furthermore, the first phantom plane 21Kx may be a top of a projection having a triangular prism shape on the display surface 20S, or may be a bottom or a side surface of a recess on the display surface 20S.

All the second surface elements 21Sy included in the second phantom plane 21Ky cooperate with each other to exhibit the optical functions as described below. That is, light incident on the second phantom plane 21Ky in the direction predefined for the second phantom plane 21Ky and having a wavelength predefined for the second phantom plane 21Ky is reflected by the respective second surface element 21Sy. Here, all the second surface elements 21Sy included in the second phantom plane 21Ky diffract light in the first specific direction, which is a direction in which the light described above is reflected and which is common to the respective second phantom planes 21Ky. In other words, all the second surface elements 21Sy included in the second phantom plane 21Ky cooperate with each other to exhibit the same functions as that of the unit reflecting surface 11S, which is described above in connection with the first embodiment, in the first specific direction.

Further, the second surface elements 21Sy of the respective superimposed pixel 21M may generate diffracted light having the same color or may generate diffracted light having different colors. When the second surface elements 21Sy of the respective superimposed pixels 21M generate the diffracted light having the same color, the display 20 generates a monochrome image which appears in the second specific direction. When the second surface elements 21Sy of the respective superimposed pixels 21M generate diffracted light having different colors, the display 20 generates a color image which appears in the second specific direction. Furthermore, the second phantom plane 21Ky may be a top of a projection having a triangular prism shape on the display surface 20S, or may be a bottom or a side surface of a recess on the display surface 20S.

Figure 10:
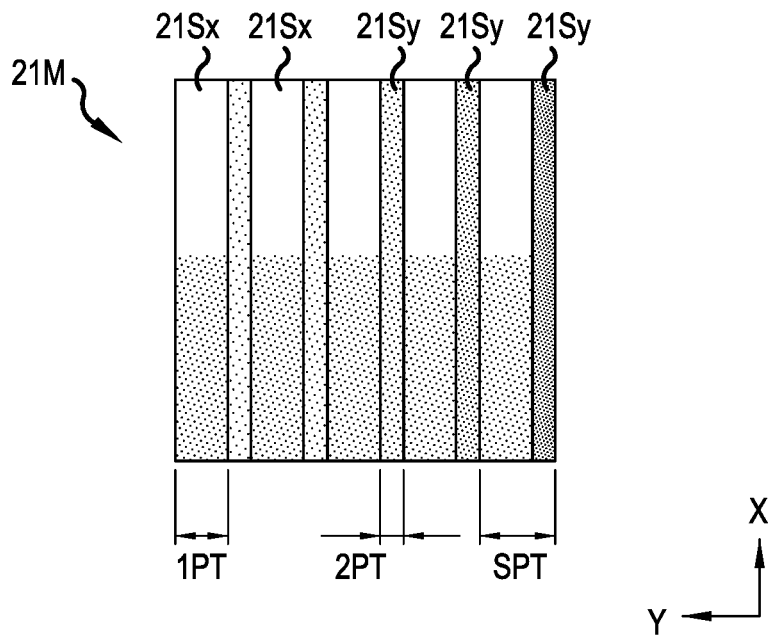
FIG. 10 is a configuration diagram schematically illustrating a planar structure of the pixels in the second embodiment.

As shown in FIG. 10, a length of the respective first surface elements 21Sx in the Y direction is a first pitch 1PT, and a length of the respective second surface elements 21Sy in the Y direction is a second pitch 2PT. Further, a sum of the first pitch 1PT and the second pitch 2PT is a repeating pitch SPT. The first pitch 1PT is preferably a size that allows light from the first surface elements 21Sx included in the superimposed pixel 21M to be visually recognized as light from a single reflecting surface, which is 0.05 mm or less, for example. Further, the first pitch 1PT of the first surface elements 21Sx in the Y direction is such that diffracted light is emitted in the traveling direction of light which has been specularly reflected by the first surface elements 21Sx. The second pitch 2PT is also preferably a size that allows the light from the second surface elements 21Sy included in the superimposed pixel 21M to be visually recognized as light from a single reflecting surface, which is 0.05 mm or less, for example. Further, the second pitch 2PT of the second surface elements 21Sy in the Y direction is such that diffracted light is emitted in the traveling direction of light which has been specularly reflected by the second surface elements 21Sy. For the purpose of ease of design of the structure that satisfies both of the above, the repeating pitch SPT is preferably 0.05 mm or less. Further, in FIG. 10 as well, the superimposed pixel 21M is shown in schematic gradation such that the smaller the distance to the display surface 20S, the darker the color applied to a surface of the pixel 11A.

As shown in FIG. 11, when the observation direction in which the display surface 20S is observed is inclined in the Y direction with respect to the Z direction, the first image PIC1, which is an image which is created by the second surface elements 21Sy and appears in the first specific direction, is visually observed. Further, an image which is created by the first surface elements 21Sx and appears in the second specific direction and an image which is created by the single-plane pixels 21N and appears in the second specific direction are not visually observed. On the other hand, when the observation direction in which the display 20 is observed is inclined in the X direction with respect to the Z direction, the superimposed image PIC2, which is an image composed of an image which is created by the first surface elements 21Sx and appears in the second specific direction and an image which is created by the single-plane pixels 21N and appears in the second specific direction, is visually observed. Further, the first image PIC1 which is created by the second surface elements 21Sy and appears in the first specific direction is not visually observed. The first surface elements 21Sx included in the first phantom plane 21Kx together with the second phantom plane 21Ky corresponding to each first phantom plane 21Kx form each superimposed pixel 21M. Since the first phantom plane 21Kx and the second phantom plane 21Ky are located in the same region when viewed in a direction facing the display surface 20S, an image having the same outline as that of the first image PIC1 is visually recognized as part of the superimposed image PIC2.

According to the second embodiment described above, the following advantageous effects are obtained.

(3) The intensity of light from the superimposed pixels 21M can be enhanced in a specific direction, and thus the visibility of an image displayed in the specific direction can be improved.

(4) The display 10 can display a color image with an improved visibility.

(5) Since the display 20 displays images in the first specific direction and the second specific direction, anti-counterfeiting measures for the display 20 can be further enhanced. Moreover, in authenticity determination of the display 20, the first image PIC1 or the superimposed image PIC2 can be visually recognized without turning the display by 180 degrees, which facilitates the authenticity determination of the display 20.

(6) Since the superimposed pixel 21M includes both the first surface elements 21Sx and the second surface elements 21Sy, the designability of the display 20, the resolution of the first image PIC1 and the resolution of the superimposed image PIC2 can be improved compared with the configuration in which the first surface elements 21Sx and the second surface elements 21Sy are included in separate pixels 11A.

(7) Since the first surface elements 21Sx and the second surface elements 21Sy are alternately arranged, the display 20 that displays both the image based on the first surface elements 21Sx and the image based on the second surface elements 21Sy can prevent the images from being displayed with a reduced resolution.

The second embodiment described above may be modified and implemented as follows.

[Tilt Angle]

The direction in which the first phantom plane 21Kx is oriented and the direction in which the second phantom plane 21Ky is oriented are equal to each other, whereas the first tilt angle θbx and the second tilt angle θby may be different from each other. According to this configuration, in addition to the effects described in the above (1) and (2), an image can be represented by high gradation in brightness and colors in a specific direction that is common to the first surface element 21Sx and the second surface element 21Sy.

Further, the plurality of superimposed pixels 21M may include the plurality of pixels 11A having the first tilt angle θbx which varies among the superimposed pixels 21M, or may include the plurality of pixels 11A having the second tilt angle θby which varies among the superimposed pixels 21M.

[Direction in which Reflecting Surface is Oriented]

The direction in which the first phantom plane 21Kx is oriented, the direction in which the second phantom plane 21Ky is oriented, and the direction in which the unit reflecting surface 11S of the single-plane pixel 21N is oriented may be different from each other. According to this configuration, different images can be displayed in the specific directions defined by the first specific direction, the second specific direction, and the unit reflecting surface 11S of the single-plane pixel 21N.

[Superimposed Pixel]

The single-plane pixels 21N may not be necessarily provided on the display surface 20S, that is, the display 20 may be configured to include only the superimposed pixels 21M. Further, the superimposed pixels 21M may not be necessarily arrayed in a matrix, and, for example, may be dotted in the single-plane pixels 21N that are arrayed in matrix. With this configuration as well, an effect similar to the above (1) to (7) can be achieved.

Further, the number of the first surface elements 21Sx included in the superimposed pixels 21M is not limited to two or more, but may be one. Similarly, the number of the second surface elements 21Sy included in the superimposed pixels 21M is not limited to two or more, but may be one. With this configuration as well, an effect similar to the above (1) to (4) can be achieved.

Figure 12:
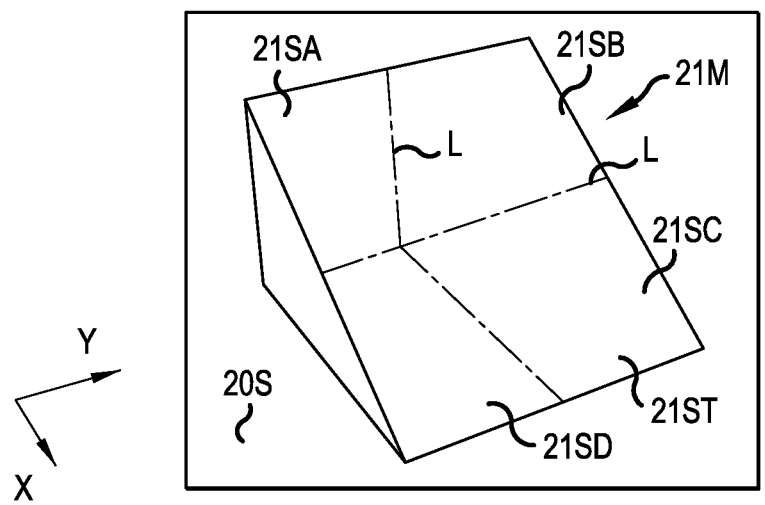
FIG. 12 is a perspective view illustrating a perspective structure of the pixels in a third modification.

As shown in FIG. 12, for example, the superimposed pixel 21M includes a bent surface 21ST, which is a surface provided for each superimposed pixel 21M and bent at a bend line L, which crosses the plane on which the superimposed pixels 21M are arranged. A set of a first unit reflecting surface 21SA and a second unit reflecting surface 21SB, and a set of a third unit reflecting surface 21SC and a fourth unit reflecting surface 21SD form a single bent surface 21ST, sharing the bend line L.

According to this bent surface 21ST, the first unit reflecting surface 21SA in each superimposed pixel 21M forms an image in the specific direction predefined for the first unit reflecting surface 21SA, and the second unit reflecting surface 21SB in each superimposed pixel 21M forms an image in the specific direction predefined for the specific direction. Further, the third unit reflecting surface 21SC in each superimposed pixel 21M forms an image in the specific direction predefined for the third unit reflecting surface 21SC, and the fourth unit reflecting surface 21SD in each superimposed pixel 21M forms an image in the specific direction predefined for the fourth unit reflecting surface 21SD. As a result, since the display 20 displays images in four different specific directions, anti-counterfeiting measures for the display 20 can be further enhanced.

[Third Modification]

In the first surface elements 21Sx of the first phantom plane 21Kx, the direction in which the first surface elements 21Sx reflect light and the direction in which the first surface elements 21Sx diffract light may be different from each other. That is, the length of the first surface elements 21Sx in the Y direction may be such that diffracted light is emitted in a direction different from the traveling direction of light which has been specularly reflected by the first surface elements 21Sx as with the first embodiment, or the first tilt angle θbx may be a value that does not satisfy the above formulae (1) and (2).

Further, in the second surface elements 21Sy of the second phantom plane 21Ky, the direction in which the second surface elements 21Sy reflect light and the direction in which the second surface elements 21Sy diffract light may be different from each other. That is, the length of the second surface elements 21Sy in the Y direction may also be such that diffracted light is emitted in a direction different from the traveling direction of light which has been specularly reflected by the second surface elements 21Sy as with the first embodiment, or the second tilt angle θby may be a value that does not satisfy the above formulae (1) and (2).

In other words, all the first surface elements 21Sx in the first phantom plane 21Kx may display an image not only by light with increased diffraction efficiency but also by reflected light which does not include diffracted light, as with the first embodiment. Further, all the second surface elements 21Sy in the second phantom plane 21Ky may display an image not only by light with increased diffraction efficiency but also by reflected light which does not include diffracted light, as with the first embodiment. Moreover, in the above embodiments and modifications as well, the display may display an image not only by light with increased diffraction efficiency but also by light reflected by the reflecting surface. With this configuration as well, an effect similar to the above (1) and (2) can be achieved.

Further, images displayed by the display 20 are not limited to raster images formed by repeating unit areas of pixels, but may also be vector images formed by a group of areas represented by vectors. In this case, the superimposed pixels 21M in the display surface 20S are not minimum units repeated to display an image, but are display areas, for example, with different sizes from each other.

According to the configuration of the above third modification, in the display 20 for displaying different images in a plurality of directions, the reflecting surfaces can be provided with a complicated structure to thereby enhance anti-counterfeiting measures for the display.

Figure 13:
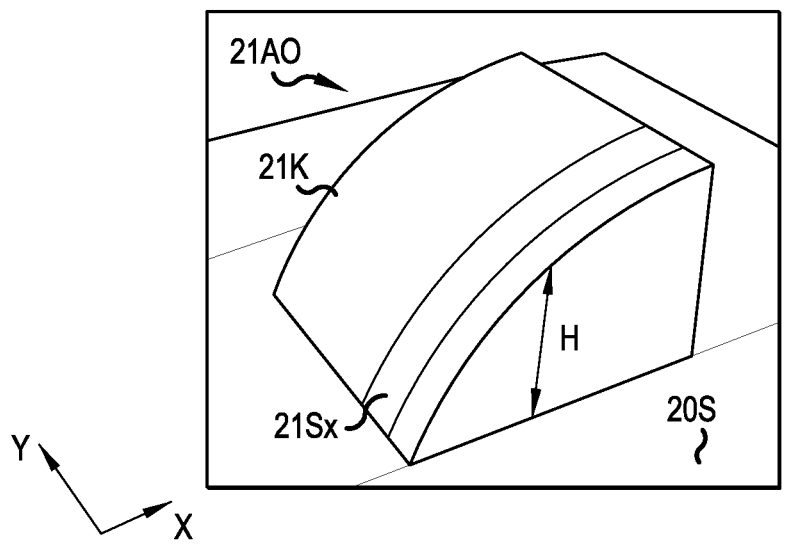
FIG. 13 is a perspective view illustrating a structure example applied to a phantom plane of a third modification.
Figure 14:
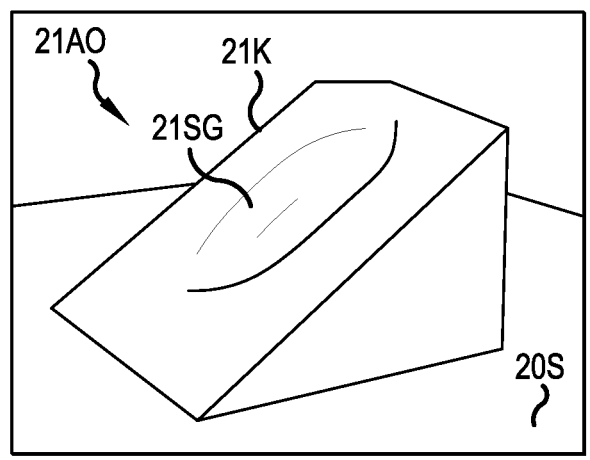
FIG. 14 is a perspective view illustrating a structure example applied to the phantom plane of the third modification.
Figure 14:
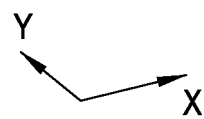
Figure 15:
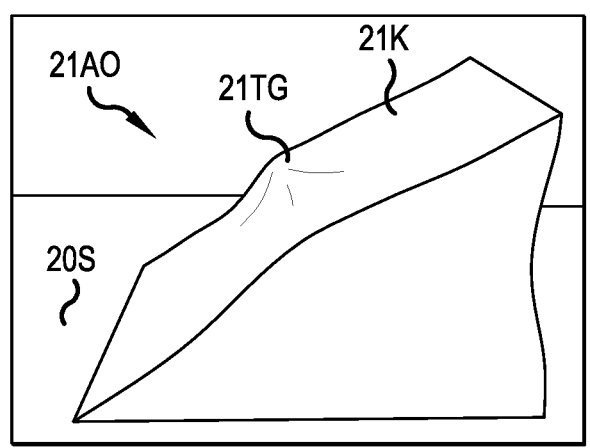
FIG. 15 is a perspective view illustrating a structure example applied to the phantom plane of the third modification.
Figure 15:
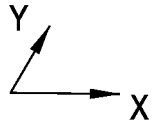

With reference to FIGS. 13 to 15, other structure examples applicable to the reflecting surface in the display area in the third modification will be described. In the examples of FIGS. 13 to 15, for the convenience of description of the structure of reflecting surface, a phantom plane which includes only the first surface elements is illustrated and a phantom plane which includes the second surface elements is omitted.

In the example shown in FIG. 13, in a display area 21AO, a distance between the phantom plane 21K which includes a plurality of first surface elements and the display surface 20S is a height H. The increment in the height H per unit distance in the X direction decreases toward the end portion of the phantom plane 21K in the X direction. That is, the phantom plane 21K is a curved surface and has a curvature protruding in the direction in which light is reflected. According to the plurality of first surface elements 21Sx included in the phantom plane 21K, light diffusion by the plurality of first surface elements 21Sx can soften the sharpness of an image displayed in the display area 21AO. Accordingly, a smooth image can be displayed.

In the example shown in FIG. 14, part of the phantom plane 21K in the display area 21AO includes a gradual recess 21SG. Light diffusion by the recess 21SG can also soften the sharpness of an image displayed in the display area 21AO.

In the example shown in FIG. 15, part of the phantom plane 21K in the display area 21AO includes a projection 21TG which gradually protrudes. Light diffusion by the projection 21TG can also soften the sharpness of an image displayed in the display area 21AO.

A technical idea derived from the above modifications is described below.

[Supplementary Note 1]

A display including:

a plurality of display areas, the plurality of display areas including a display area which includes a first unit reflecting surface that reflects incident light into a first direction, and a second unit reflecting surface that reflects incident light into a second direction, wherein the first unit reflecting surface is composed of the plurality of first surface elements included in a first phantom plane, the second unit reflecting surface is composed of the plurality of second surface elements included in a second phantom plane, the first surface elements and the second surface elements are alternately arranged in an arrangement direction as viewed in a direction facing a plane on which the display areas are arrayed, and a direction in which the first phantom plane is oriented and a direction in which the second phantom plane is oriented are different from each other.

According to the configuration described in the above supplementary note 1, the first surface elements and the second surface elements are alternately arranged in an arrangement direction when viewed in a direction facing the plane on which the display areas are arrayed, while the direction in which the first phantom plane is oriented and the direction in which the second phantom plane is oriented are different from each other. Accordingly, in the display for displaying two images in mutually different directions, the reflecting surfaces of a single display area can be provided with a complicated structure to thereby enhance anti-counterfeiting measures for the display.

[Supplementary Note 2]

A display including:

a plurality of display areas, the plurality of display areas including a display area which includes a first unit reflecting surface that reflects incident light into a first direction, and a second unit reflecting surface that reflects incident light into a second direction, wherein the first unit reflecting surface is composed of the plurality of first surface elements included in a first phantom plane, the second unit reflecting surface is composed of the plurality of second surface elements included in a second phantom plane, the first surface elements and the second surface elements are alternately arranged in an arrangement direction as viewed in a direction facing a plane on which the display areas are arrayed, and an angle formed between the plane on which the display areas are arrayed and the first phantom plane and an angle formed between the plane on which the display areas are arrayed and the second phantom plane are different from each other.

According to the configuration described in the above supplementary note 2, the first surface elements and the second surface elements are alternately arranged in an arrangement direction when viewed in a direction facing the plane on which the display areas are arrayed, while an angle formed between the plane on which the display areas are arrayed and the first phantom plane and an angle formed between the plane on which the display areas are arrayed and the second phantom plane are different from each other. Accordingly, in the display for displaying an image by the first unit reflecting surface and an image by the second unit reflecting surface, the reflecting surfaces of a single display area can be provided with a complicated structure to thereby enhance anti-counterfeiting measures for the display.

[Supplementary Note 3]

A display including:

a plurality of display areas, the plurality of display areas including a display area which includes a first unit reflecting surface that reflects incident light into a first direction, and a second unit reflecting surface that reflects incident light into a second direction, wherein the display area includes a bent surface, which is a surface provided for each display area and bent at a bend line, which crosses the plane on which the display areas are arranged, and the first unit reflecting surface which is a flat surface and the second unit reflecting surface which is a flat surface form the bent surface, sharing the bend line.

According to the configuration described in the above supplementary note 3, the first unit reflecting surface and the second unit reflecting surface form the bent surface for each display area. Accordingly, in the display for displaying an image by the first unit reflecting surface and an image by the second unit reflecting surface, the unit reflecting surfaces of the display area can be provided with a complicated structure to thereby enhance anti-counterfeiting measures for the display.

Third Embodiment

Structural colors are produced by microstructures on the order of light wavelengths, and there are known displays that generate structural colors. Example of such displays include those having a microstructure formed of an array of microparticles. For example, the display includes a substrate, a reflection layer, and a display layer, wherein the display layer includes a periodic structure formed of a plurality of microparticles. In the reflection layer, a surface that is in contact with the display layer is a flat surface. Lattices composed of the microparticles are arrayed on the flat surface and layered on the flat surface.

In such a display, the lattices composed of the microparticles are arrayed on the flat surface, and a particle array plane which is defined by the microparticles is uniquely defined by the flat surface. In this case, the color of light emitted from the microparticle layer, that is, the wavelength of light, is substantially determined by a refractive index of the display layer, a distance between the particle array planes, and an angle formed between the perpendicular line to the display and the observation direction. As a result, when the refractive index of the display layer is uniform in the configuration in which the particle array plane is uniquely defined by the flat surface, the number of colors of light emitted into a specific observation direction is limited to one.

Accordingly, in the display having such a display layer, an image visually observed in a specific observation direction tends to be a monochromatic single-color image. Therefore, displays that display an image with improved designability are required.

With reference to FIGS. 16 to 29, a display according to a third embodiment and an embodiment of an article will now be described.

[Configuration of Display]

Figure 16:
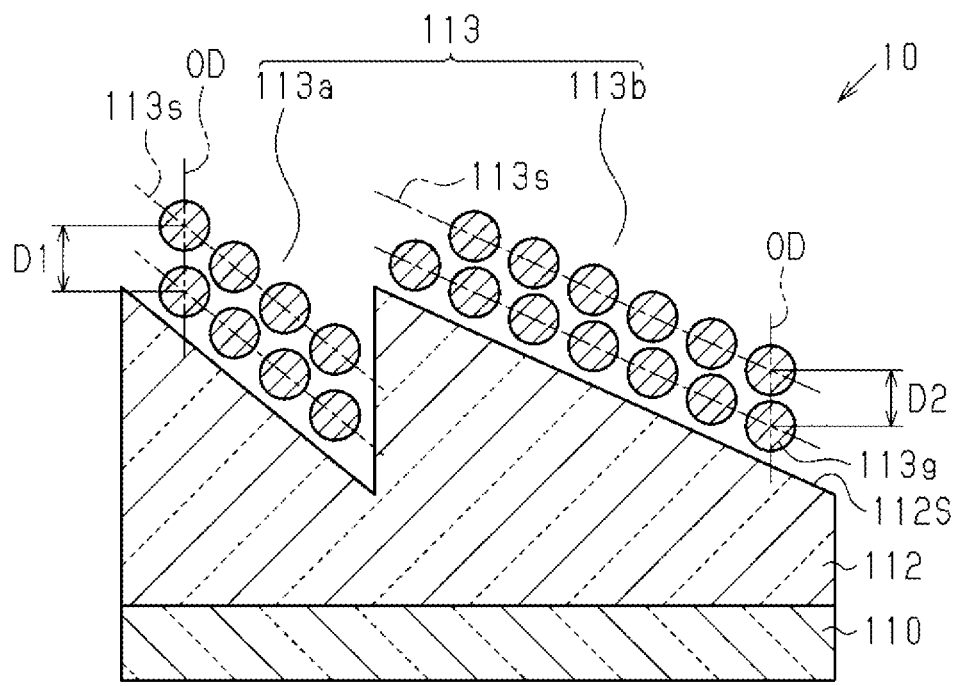
FIG. 16 is a partial cross-sectional view illustrating a partial cross-sectional structure of the display in the third embodiment.

As shown in FIG. 16, the display 10 include a substrate 110, a support layer 112, and a microparticle layer 113. The support layer 112 has a surface 112S, and at least part of the surface 112S has fine irregularities. The substrate 110 has a plate-shape extending along a single plane, and both the substrate 110 and the support layer 112 are light transparent.

In the display 10, the microparticle layer 113 includes a plurality of microparticles 113g that constitute a particle array plane 113s for generating structural colors. The microparticle layer 113 includes a first layer element 113a and a second layer element 113b. The first layer element 113a has a first distance D1, which is a distance between the particle array planes 113s in observation direction OD, while the second layer element 113b has a second distance D2, which is a distance between the particle array planes 113s in observation direction OD. The first layer element 113a differs from the second layer element 113b in at least one of (a) to (d) described below.

That is, the first layer element 113a and the second layer element 113b are different from each other in at least one of (a) a center distance between the microparticles 113g in the observation direction OD, (b) a two-dimensional plane in which the layer elements extend, (c) a two-dimensional plane in which the particle array plane 113s extends, and (d) an arrangement of the microparticles 113g in the particle array plane 113s. The difference between the first layer element 113a and the second layer element 113b in the two-dimensional plane in which the layer elements extend is a difference in the normal direction of the surface supporting the layer elements. The difference between the first layer element 113a and the second layer element 113b in the two-dimensional plane in which the particle array planes 113s extend is a difference in the normal direction to the particle array plane 113s. The arrangement of the microparticle 113g is an arrangement of the plurality of microparticles 113g in the particle array plane 113s, which may be, for example, a body-centered cubic structure or a face-centered cubic structure.

In the first layer element 113a and the second layer element 113b, the first distance D1 and the second distance D2 are different from each other due to a difference in at least one of (a) to (d).

Further, a distance between the display 10 and an observation point, which is a viewpoint of an observer, is much larger than the size of the first layer element 113a and the size of the second layer element 113b. The observation direction OD is a direction of gaze of an observer. Accordingly, the observation direction OD relative to the first layer element 113a and the observation direction OD relative to the second layer element 113b can be regarded as substantially parallel with each other. The observation direction OD relative to different points in the entire display 10, as well as the first layer element 113a and the second layer element 113b, can also be regarded as parallel with each other.

According to the display 10, the wavelength of light emitted from the first layer element 113a in the observation direction OD and the wavelength of light emitted from the second layer element 113b in the observation direction are different from each other. Accordingly, compared with the configuration in which light emitted from one microparticle layer 113 in the observation direction OD has a uniform wavelength, light emitted from the microparticle layer 113 has various wavelengths. As a result, the designability of an image displayed by the display 10 can be improved.

Further, the display 10 may be observed in a direction facing the microparticle layer 113, or may be observed in a direction facing the substrate 110. In the microparticle layer 113, a layer composed of a plurality of particles arrayed in a single particle array plane is a unit layer. In the microparticle layer 113, the plurality of microparticles 113g are arranged in the most periodic manner in a first layer, which is the unit layer that is in contact with the surface 112S of the support layer 112. On the other hand, the farther the unit layer in the microparticle layer 113 is from the first layer, the more the arrangement of the microparticles 113g is disordered.

In particular, when the surface 112S of the support layer 112 includes two or more regions, each of which extends in different two-dimensional planes, and two of the regions extending in different two-dimensional planes are adjacent to each other, the microparticles arrayed in different directions at the interface of these two regions may be mixed with each other. As a consequence, the arrangement of the microparticles in such regions often seems to be disordered. In order to clearly obtain the diffraction effect in the microparticle layer 113, the display 10 is preferably observed in a direction facing the substrate 110.

[Wavelength of Light Emitted from Microparticle Layer]

Figure 17:
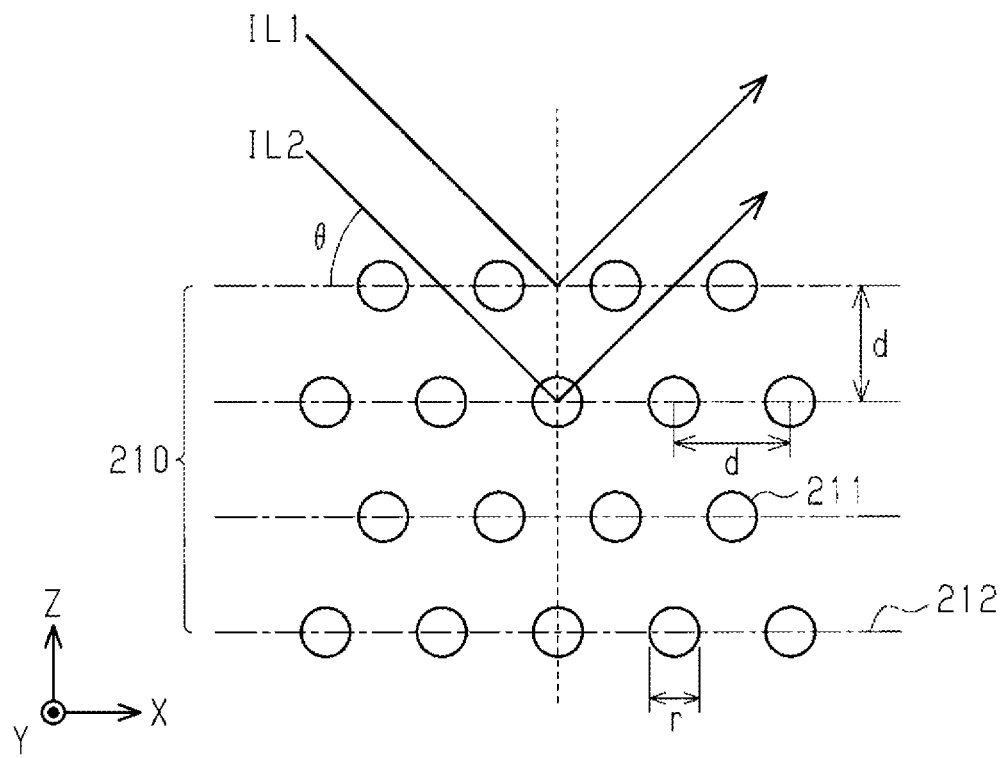
FIG. 17 is a schematic diagram illustrating diffraction of light in a microparticle layer in the third embodiment.
Figure 18:
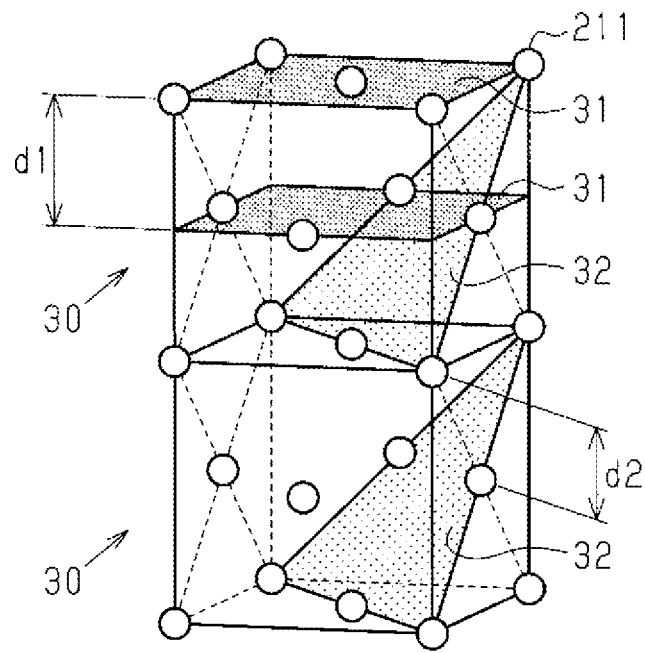
FIG. 18 is a perspective view illustrating an example of an array of microparticles in the microparticle layer.
Figure 19:
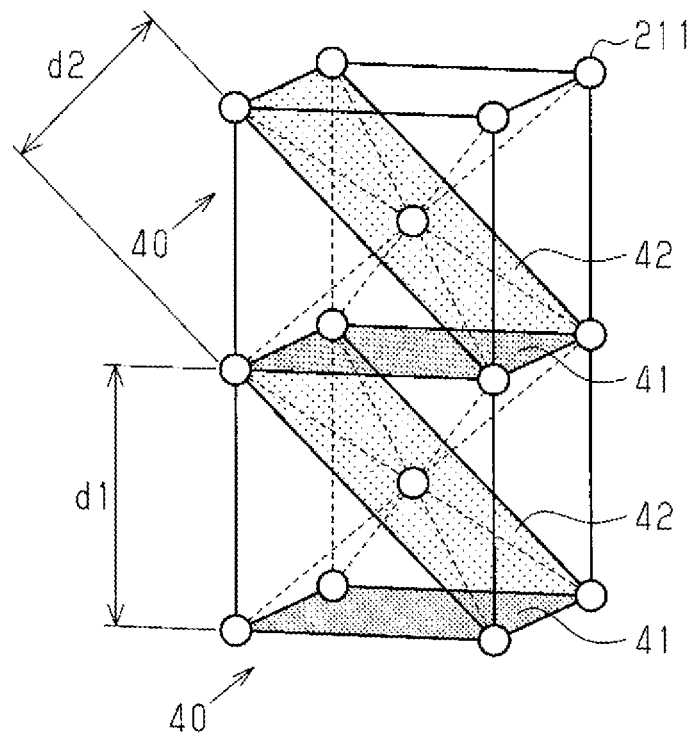
FIG. 19 is a perspective view illustrating an example of an array of microparticles in the microparticle layer.

With reference to FIGS. 17 to 19, the principle of the wavelength of light emitted from the first layer element 113a and the wavelength of light emitted from the second layer element 113b being different from each other will be described below.

FIG. 17 is a conceptual diagram illustrating diffraction of light in the microparticle layer 210, and the Z direction in FIG. 17 is a direction perpendicular to the particle array plane 212 of the microparticle layer 210. The X direction and the Y direction are each perpendicular to the Z direction, and the particle array plane 212 extends in a two-dimensional plane defined by the X direction and the Y direction. When an incident light IL is incident on the microparticle layer 210, in which the microparticles 211 are arranged with a predetermined periodicity, light diffraction which satisfies the formula (1) described below occurs according to Bragg's law.

[Math. 1]

$$m\lambda = 2nd \sin \theta \qquad \text{formula (1)}$$

In the formula (1), m is a diffraction order, $\lambda$ is a wavelength of the diffracted light, n is a refractive index of a colloidal crystal, d is a distance between the particle array planes, that is, an inter-array plane distance, and $\theta$ is an incidence angle of the incident light IL. Further, the colloidal crystal refers to a structure in which the microparticles 211 are arrayed with three-dimensional periodicity and which generates structural colors.

The refractive index n can be approximately determined by the refractive index of a volume-average of the medium that fills a space between the microparticles 211. When the filling ratio of the microparticle is $\varphi$, the refractive index of the microparticle 211 is nP, the refractive index of the medium is nB, and the refractive index of the colloidal crystal is nC, the formula (2) described below is approximately established.

[Math. 2]

$$nc = nP\varphi + nB(1-\varphi) \qquad \text{formula (2)}$$

The formula (1) represents that, when the incident light IL1 and the incident light IL2 are each incident at an angle $\theta$ on the particle array plane 212 in which the microparticles 211 are arrayed at the inter-array plane distance d, light emitted at the angle $\theta$ has the wavelength $\lambda$ by which the optical path difference 2nd sin $\theta$ of the incident light IL1 and the incident light IL2 satisfy the formula (1). Further, when viewed from another perspective, the formula (1) represents that, even if the incident light is incident at the same angle $\theta$, the wavelength $\lambda$ of the emitted light which has been enhanced by diffraction by the microparticle layer 210 varies due to a difference in the inter-array plane distance d.

In FIG. 17, the incident light which is incident on the microparticle layer 210 at the angle $\theta$ is emitted at a symmetric angle $\theta$ of the incident light with respect to the plane perpendicular to the particle array plane 212. That is, the reflection angle is equal to the incidence angle. FIG. 17 shows that the tilt angle of the particle array plane 212 is 0 degrees, in other words, the particle array plane 212 is horizontal. On the other hand, in the configuration previously described in connection with FIG. 16, in which the surface 112S of the support layer 112 includes an inclined surface, the normal direction to the inclined surface is deviated from the normal direction to the horizontal direction by the tilt angle. Accordingly, regions of the surface having inclinations different from each other have different sine, in the formula (1), which causes difference in the wavelength $\lambda$ of light emitted from the respective portions. As a result, when the display 10 is observed at a specific angle, in other words, in a specific observation direction, colors which are locally different can be observed.

The microparticle 211 constituting the microparticle layer 210 preferably has an average particle diameter r in the range of 0.1 µm or more and 1 µm or less, and more preferably, 180 nm or more and 380 nm or less. In the formula (1), assuming that the diffraction order m is 1 and the refractive index n is 1, the wavelength $\lambda$ of the diffracted light becomes twice the inter-array plane distance d when the incident light angle $\theta$ is 90 degrees.

It is known that the colloidal crystals described above include close-packed opal crystals and non-close-packed colloidal crystals. In opal crystals, the inter-array plane distance d is consistent with the average particle diameter r of the microparticles 211. Accordingly, when the average particle diameter r of the microparticles 211 is in the range of 180 nm or more and 380 nm or less, the opal crystals emit light having a wavelength in the visible light region so that light emitted from the opal crystals can be easily visually observed. Further, even if the average particle diameter r of the microparticles 211 is not within this range, light emitted from the opal crystals can be visually observed by observing diffracted light of the diffraction order m of 2 or by changing the angle at which the opal crystals are observed.

FIG. 18 illustrates a schematic structure of a face-centered cubic lattice, and FIG. 19 illustrates a schematic structure of a body-centered cubic lattice. Further, for the convenience of illustration, FIGS. 18 and 19 illustrate a structure in which one unit lattice is stacked on one unit lattice.

Among the colloidal crystals, close-packed opal crystals have a hexagonal close-packed structure or a face-centered cubic structure, while non-close-packed colloidal crystals have a face-centered cubic structure or a body-centered cubic structure.

As is obvious from the above formula (1), the wavelength $\lambda$ of light emitted from the microparticle layer at a specific angle $\theta$ varies depending on the inter-array plane distance d. In the face-centered cubic lattice 30 shown in FIG. 18, a first array plane 31 and a second array plane 32 are illustrated as an example of the particle array plane that can be set in the unit lattice. Further, in the body-centered cubic lattice 40 shown in FIG. 19, a first array plane 41 and a second array plane 42 are illustrated as an example of the particle array planes that can be set in the unit lattice.

The first array planes 31 and 41 are the particle array planes which are horizontal to the bottom of the unit lattice, while the second array planes 32 and 42 are the particle array planes which are inclined to the bottom of the unit lattice by 45 degrees. The distance between the first array planes 31 and 41 is an inter-first array plane distance d1, and a distance between the second array plane 32 and 42 is an inter-second array plane distance d2. When the length of one side of the unit lattice is t, the inter-first array plane distance d1 and the inter-second array plane distance d2 in the face-centered cubic lattice 30 can be represented by the formulae (3) and (4) described below.

[Math. 3]

$$d1 = (1/2)t \qquad \text{formula (3)}$$

[Math. 4]

$$d2 = (1/\sqrt{3})t \qquad \text{formula (4)}$$

Further, the inter-first array plane distance d1 and the inter-second array plane distance d2 in the body-centered cubic lattice 40 can be represented by the formulae (5) and (6) described below.

[Math. 5]

$$d1 = t \qquad \text{formula (5)}$$

[Math. 6]

$$d2 = (1/\sqrt{2})t \qquad \text{formula (6)}$$

As described above, the inter-array plane distance d varies depending on how the particle array plane is set in one unit lattice. Further, the inter-array plane distance d also varies depending on the structure of the unit lattice, in other words, arrangement of microparticles in the particle array plane. In the formula (1) described above, when the diffraction order m, the refractive index n, and the incident light angle θ are constant, the wavelength λ is proportional to the inter-array plane distance d.

Accordingly, in the face-centered cubic lattice 30, the wavelength of light reflected by the second array plane 32 has a length approximately 0.7 times the wavelength of light reflected by the first array plane 31. For example, when the wavelength of light reflected by the first array plane 31 is 700 nm, the wavelength of light reflected by the second array plane 32 is 490 nm. That is, the color of light reflected by the first array plane 31 is red, while the color of light reflected by the second array plane 32 is blue or green. The color of light reflected by the respective particle array planes varies significantly.

Further, the inter-array plane distance d in the formula (1) is determined by the microparticle size and the distance between the microparticles 211. That is, the inter-array plane distance d is determined by the center distance between the microparticles 211. Further, of the colloidal crystals, the opal crystals have a microparticle size which corresponds to the inter-array plane distance d. On the other hand, in the non-close-packed colloidal crystals, van der Waals force, which is an electrostatic repulsion acting between microparticles, is a physical quantity determined by the microparticle size and the distance between microparticles. Accordingly, the inter-array plane distance d is determined by both the average particle diameter r of the microparticles 211 and the distance between microparticles.

As described above, the inter-array plane distance d is different between opal crystals and non-close-packed colloidal crystals. Such a difference in the inter-array plane distance d between two types of crystals has an effect on a lattice constant of the respective crystals. More specifically, in non-close-packed colloidal crystals, the microparticles 211 are not in contact with each other. Accordingly, the lattice constant is not determined even if the particle diameter of the microparticle 211 is determined. In general, it is known that, among the average particle diameter r, the lattice constant a, and the microparticle filling ratio φ, the formula (7) is established for the face-centered cubic structure, and the formula (8) is established for the body-centered cubic structure.

[Math. 7]

$$\phi = (2\pi/3)(d/a)3 \qquad \text{formula (7)}$$

[Math. 8]

$$\phi = (\pi/3)(d/a)3 \qquad \text{formula (8)}$$

[Number of Unit Layers in Microparticle Layer]

In the microparticle layer 210 previously described in connection with FIG. 17, the microparticle layer 210 preferably includes two or more unit layers in order to obtain light diffraction effect. In other words, in the microparticle layer 210, it is preferred that a plurality of microparticles constitute a plurality of particle array planes.

Further, in the microparticle layer 113 previously described in connection with FIG. 16, it is preferred that the plurality of microparticles 113g included in the first layer element 113a and the plurality of microparticles 113g included in the second layer element 113b constitute a plurality of particle array planes 113s in the corresponding layer elements. Since the intensity of diffracted light increases with an increase in the number of particle array planes 113s, the visibility of structural colors improves with an increase in the number of particle array planes 113s.

Further, when the microparticle layer 210 described above has a configuration which includes a first portion formed by a predetermined number of unit layers and a second portion formed by the number of unit layers different from that of the first portion, gradation can be generated between the structural colors in the first portion and the structural colors in the second portion. Accordingly, compared with the configuration that cannot represent such gradation, the designability of the image created by the display is improved.

In order to increase the number of unit layers constituting the microparticle layer 210, the shape of the support layer can be modified as described below. That is, when the surface of the support layer has a predetermined tilt angle, a positional difference between one end and the other end of the surface in the cross-section taken along the thickness direction of the display can be increased. Alternatively, when there is no positional difference between one end and the other end of the surface in the cross-section taken along the thickness direction of the display, the tilt angle of the surface can be increased. Further, the number of unit layers constituting the microparticle layer 210 can also be increased by reducing the particle diameter of the microparticle 211.

[Example Configuration of Display]

Figure 20:
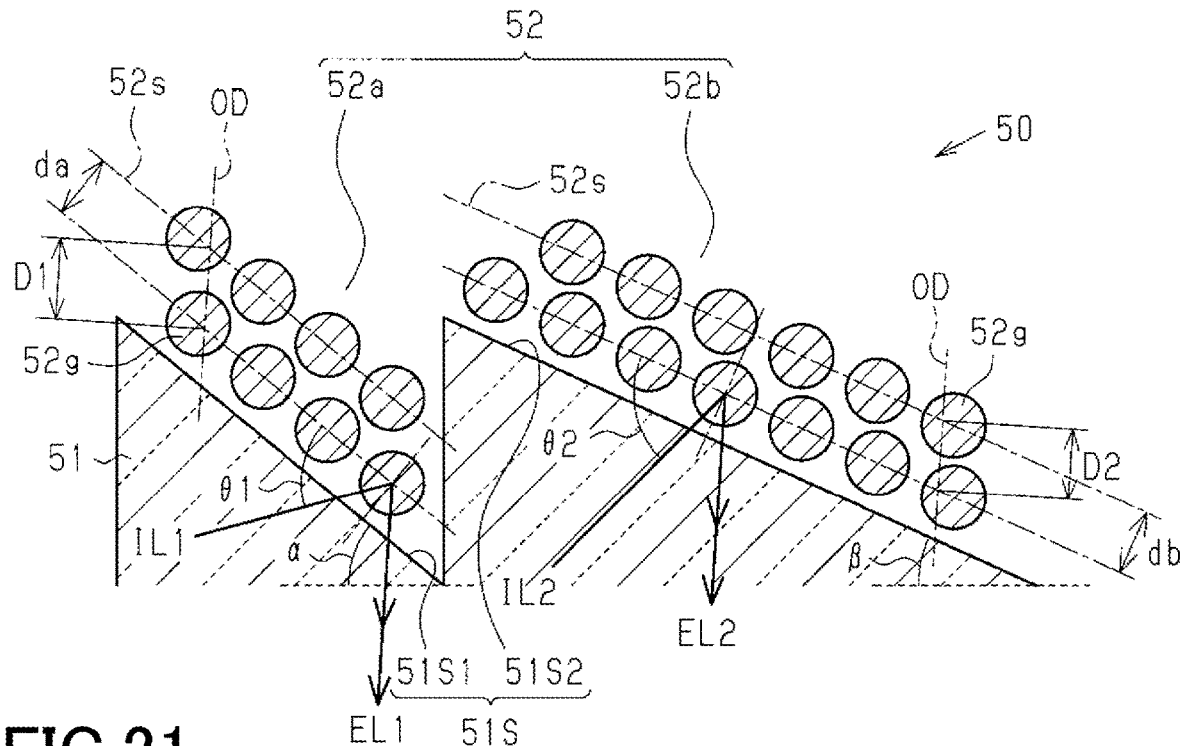
FIG. 20 is a partial cross-sectional view illustrating a partial cross-sectional structure of an example of the display.
Figure 21:
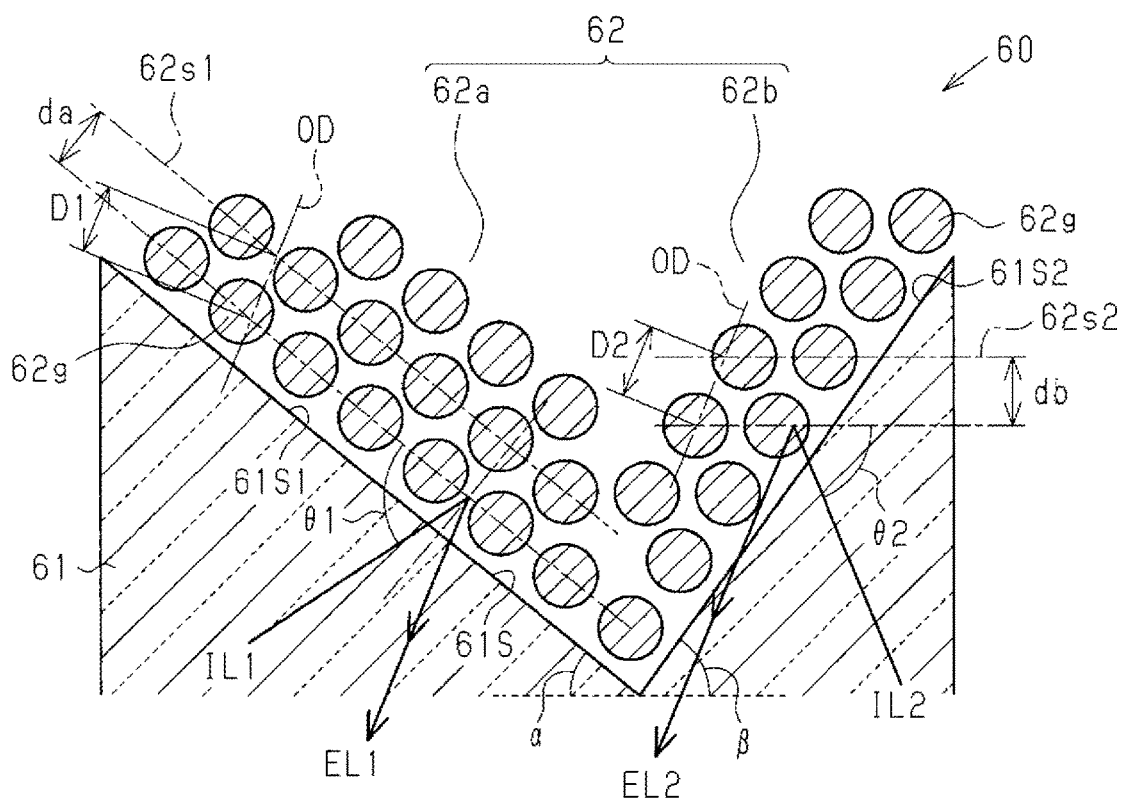
FIG. 21 is a partial cross-sectional view illustrating a partial cross-sectional structure of an example of the display.
Figure 22:
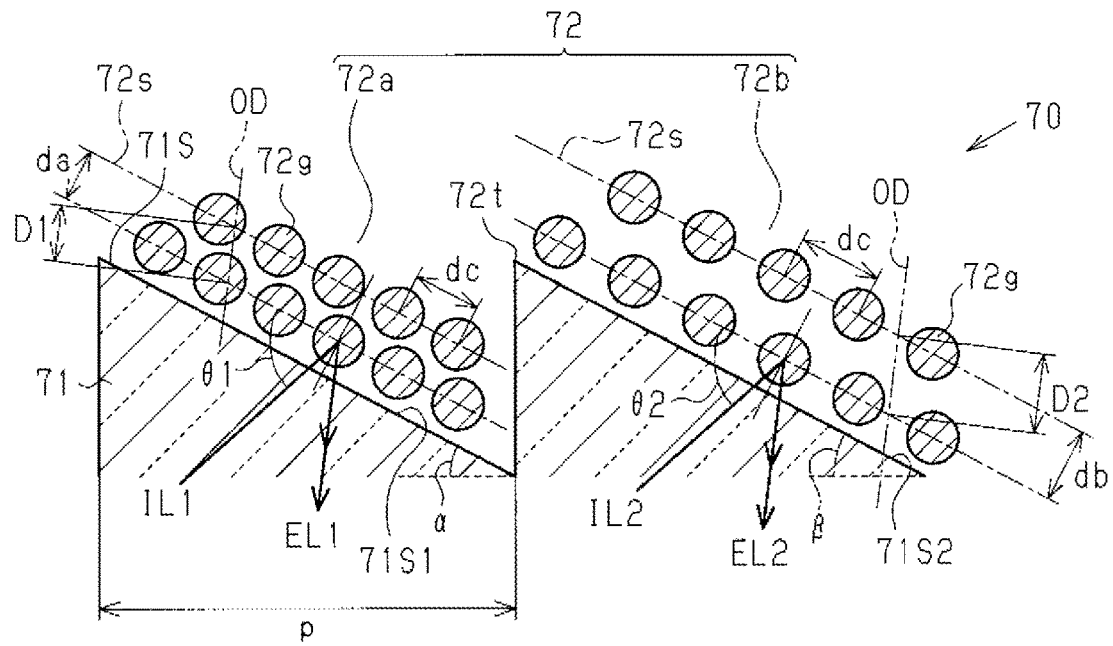
FIG. 22 is a partial cross-sectional view illustrating a partial cross-sectional structure of an example of the display.

With reference to FIGS. 20 to 22, an example of the configuration of the display will be described. In the following description, three examples of the display having mutually different configurations will be described. Further, for the convenience of illustration, only part of the support layer and the microparticle layer in the display 10 are illustrated in FIGS. 20 to 22.

[First Form]

As shown in FIG. 20, a microparticle layer 52 includes a first layer element 52a and a second layer element 52b. The first layer element 52a and the second layer element 52b are different from each other in two-dimensional plane in which the layer elements extend. Further, the first layer element 52a and the second layer element 52b are also different from each other in two-dimensional plane in which the particle array planes 52s of the layer elements extend.

A display 50 includes a support layer 51, and the support layer 51 includes a surface 51S that supports the microparticle layer 52. The surface 51S includes a first support surface 51S1 that supports the first layer element 52a, and a second support surface 51S2. The two-dimensional plane in which the first support surface 51S1 extends and the two-dimensional plane in which the second support surface 51S2 extends are different from each other.

When the substrate 110 is horizontally positioned, an angle of the surface 51S inclined to the horizontal direction, that is, an angle formed between the horizontal direction and the surface 51S, is a tilt angle. A tilt angle α formed by the first support surface 51S1 of the surface 51S and a tilt angle θ formed by the second support surface 51S2 are different from each other, and the tilt angle α is larger than the tilt angle β. In other words, the support layer 51 is a fine protrusion and recess structure, and includes protrusions having the first support surfaces 51S1 and protrusions having the second support surfaces 51S2.

The particle array plane 52s of the first layer element 52a extends along the first support surface 51S1, and the particle array plane 52s of the second layer element 52b extends along the second support surface 51S2. In each of the first layer element 52a and the second layer element 52b, the microparticles 52g are regularly arranged along the particle array plane 52s. An inter-array plane distance da in the first layer element 52a and an inter-array plane distance db in the second layer element 52b are the same as each other.

The two-dimensional plane in which the first support surface 51S1 extends and the two-dimensional plane in which the second support surface 51S2 extend, in other words, the normal direction to the first support surface 51S1 and the normal direction to the second support surface 51S2, are different from each other. As described above, since the particle array plane 52s of the first layer element 52a extends along the first support surface 51S1, and the particle array plane 52s of the second layer element 52b extends along the second support surface 51S2, the normal direction to the first layer element 52a and the normal direction to the second layer element 52b are different from each other.

Light emitted from the first layer element 52a in a predetermined observation direction OD is an emitted light EL1, and light emitted from the second layer element 52b into the same direction as that of the emitted light EL1 is an emitted light EL2. Further, light which is for emitting the emitted light EL1 is incident light ILL and light which is for emitting the emitted light EL2 is an incident light IL2. An angle θ1 of the incident light IL1 being incident on the first layer element 52a and an angle θ2 of the incident light IL2 being incident on the second layer element 52b are different from each other.

Therefore, according to the above formula (1), that is, Bragg's law, a wavelength λ1 of the emitted light EL1 and a wavelength λ2 of the emitted light EL2 are different from each other. As a result, a color of light emitted from the first layer element 52a and a color of light emitted from the second layer element 52b into a predetermined observation direction OD are different from each other.

The display 50 is often observed while being inclined to the horizontal direction by 45 degrees. Here, an angle formed between the light traveling straight from the display 50 toward the eye of an observer observing the display 50 and the normal direction to the display 50 is 45 degrees.

Accordingly, the angle θ1 of light incident on the first layer element 52a can be represented by the formula (9) described below by using the tilt angle α of the first support surface 51S1.

[Math. 9]

$$\theta 1 = 45 - \alpha \qquad \text{formula (9)}$$

When the formula (10) is established for the tilt angle α, reflected light from the microparticle layer 52 can be obtained.

[Math. 10]

$$\alpha < 45 - \alpha < 45 \qquad \text{formula (10)}$$

That is, when the tilt angle α is larger than 0 degree and smaller than 22.5 degrees, reflected light from the first layer element 52a can be obtained. Since a similar relationship is established for the second layer element 52b, reflected light from the second layer element 52b can be obtained when the tilt angle β is larger than 0 degree and smaller than 22.5 degrees. By forming the support layer 51 to satisfy these conditions, the display 50 can generate structural colors in the most general observation state.

When the tilt of the display 50 to the horizontal direction is modified to an angle other than 45 degrees, or light of higher diffraction order is observed, the tilt angle α of the first support surface 51S1 and the tilt angle β of the second support surface 51S2 may be an angle outside the above range. In this configuration as well, the emitted light EL1 from the first layer element 52a and the emitted light EL2 from the second layer element 52b can be observed.

[Second Form]

As shown in FIG. 21, a microparticle layer 62 includes a first layer element 62a and a second layer element 62b. The two-dimensional plane in which the first layer element 62a extends and the two-dimensional plane in which the second layer element 62b extends intersect with each other, and a direction in which a particle array plane 62s1 in the first layer element 62a is oriented and a direction in which a particle array plane 62s2 in the second layer element 62b is oriented are different from each other.

The direction in which the particle array plane is oriented is a direction in which the particle array plane faces. While the incidence angle of light incident on the microparticle layer 62 has a predetermined range, light with a predetermined incidence angle, among the incident light, is most strongly reflected. Accordingly, among the emitted light from the microparticle layer 62, the intensity of light becomes highest when emitted at an angle which is the same as the incidence angle of the incident light having the highest intensity.

The observer of a display 60 visually recognizes, among the emitted light, light in which emitted light with highest intensity and the remaining emitted light are mixed. Accordingly, it is preferred that the direction in which the particle array plane 62s1 of the first layer element 62a is oriented and the direction in which the particle array plane 62s2 of the second layer element 62b is oriented are different from each other to an extent by which the color of light emitted from the first layer element 62a and the color of light emitted from the second layer element 62b can be visually recognized as different colors by the observer observing the mixed light described above. For example, it is preferred that the direction in which the particle array plane 62s1 of the first layer element 62a is oriented and the direction in which the particle array plane 62s2 of the second layer element 62b is oriented are different from each other so that the wavelength of light emitted from the first layer element 62a and the wavelength of light emitted from the second layer element 62b are different by approximately 20 nm to 50 nm.

When the direction in which the particle array plane 62s1 of the first layer element 62a is oriented and the direction in which the particle array plane 62s2 of the second layer element 62b is oriented are different from each other, the angle θ1 of the incident light IL1 being incident on the first layer element 62a and the angle θ2 of the incident light IL2 being incident on the second layer element 72b are typically different from each other.

In the first layer element 62a, the two-dimensional plane in which the first layer element 62a extends and the two-dimensional plane in which the particle array plane 62s1 extends are parallel with each other. On the other hand, in the second layer element 62b, the two-dimensional plane in which the second layer element 62b extends and the two-dimensional plane in which the particle array plane 62s2 extends intersect with each other.

On the surface 61S of the support layer 61, the direction in which the first support surface 61S1 is oriented and the direction in which the second support surface 61S2 is oriented are different. In addition, the tilt angle α of the first support surface 61S1 and the tilt angle β of the second support surface 61S2 are different from each other. The first layer element 62a extends along the first support surface 61S1, and the second layer element 62b extends along the second support surface 61S2.

In each of the first layer element 62a and the second layer element 62b, the microparticles 62g are regularly arranged along the surface 61S. In emitting light in the predetermined observation direction OD, the particle array plane 62s1 extending along the first support surface 61S1 is a reflecting surface when the incident light IL1 is incident on the first layer element 62a, while the particle array plane 62s2 which intersects with the second support surface 61S2 is a reflecting surface when the incident light IL2 is incident on the second layer element 62b.

Accordingly, an inter-array plane distance da in the first layer element 62a and an inter-array plane distance db in the second layer element 62b are different from each other. Since the first support surface 61S1 and the second support surface 61S2 are different from each other in the directions in which the respective surfaces are oriented and the tilt angles, the wavelength λ1 of the emitted light EL1 emitted from the first layer element 62a and the wavelength λ2 of the emitted light EL2 emitted from the second layer element 62b can be different from each other.

Further, in the first form and the second form, the microparticle layer can also be configured such that the wavelength λ1 of the emitted light EL1 and the wavelength λ2 of the emitted light EL2 are different from each other in one observation direction OD, while the wavelength λ1 of the emitted light EL1 and the wavelength λ2 of the emitted light EL2 are equal to each other in another observation direction OD. In this configuration, the color of image displayed by the display can be variable depending on the observation angle OD to thereby improve the eye-catching effect.

[Third Form]

As shown in FIG. 22, in a microparticle layer 72, the distance between microparticles 72g is an inter-particle distance dc. The inter-particle distance dc is different between a first layer element 72a and a second layer element 72b.

On a surface 71S of a support layer 71, the two-dimensional plane in which a first support surface 71S1 extends and the two-dimensional plane in which a second support surface 71S2 extends are equal to each other, and the tilt angle α of the first support surface 71S1 and the tilt angle β of the second support surface 71S2 are the same angle. The first support surface 71S1 and the second support surface 71S2 are parallel with each other.

The first layer element 72a extends on the first support surface 71S1, and the particle array plane 72s of the first layer element 72a also extends on the first support surface 71S 1. Further, the second layer element 72b extends on the second support surface 71S2, and the particle array plane 72s of the second layer element 72b also extends on the second support surface 71S2.

Accordingly, the normal direction to the first layer element 72a and the normal direction to the second layer element 72b are parallel with each other. Therefore, when the angle θ1 of the incident light IL1 being incident on the first layer element 72a and the angle θ2 of the incident light IL2 being incident on the second layer element 72b are equal, the emitted light EL1 of the first layer element 72a and the emitted light EL2 of the second layer element 72b are emitted in the same predetermined observation direction OD.

As is obvious from the above formula (1), the wavelength λ1 of the emitted light EL1 and the wavelength λ2 of the emitted light EL2 are determined by the inter-array plane distance d and the incident light angle θ. In the support layer 71 having a predetermined shape, light emitting direction, as well as the angle θ of light incident on the support layer 71, thus the microparticle layer 72, are determined by setting an observation direction for the display 70. Accordingly, the formula (1) can also be represented as a function of the wavelength λ and the inter-array plane distance d.

Therefore, light having a predetermined wavelength in the observation direction OD can be obtained by obtaining the inter-array plane distance d by the formula (1), and then selecting the microparticle 72g having a particle diameter that satisfies the inter-array plane distance d calculated above. Alternatively, a material that causes repulsive force between the microparticles 71g to satisfy the inter-array plane distance d calculated above can be selected as a material for forming the microparticle layer 72.

According to such a display 70, in the microparticle layer 72, the inter-array plane distance da in the first layer element 72a and the inter-array plane distance db in the second layer element 72b are different from each other. Accordingly, the wavelength of light emitted from the first layer element 72a and the wavelength of light emitted from the second layer element 72b into the observation direction OD can be different from each other.

In the support layer 71, a position which is farthest from the substrate in the thickness direction of the display 70 is a vertex 72t. In the support layer 71, a distance between the vertex 72t of the first support surface 71S1 and the vertex 72t of the second support surface 71S2 is an inter-vertex distance p. In order to prevent diffracted light from being emitted from the support layer 71, the inter-vertex distance p is preferably 1 µm or more. The reason that the inter-vertex distance is preferably 1 µm or more is described below.

As a condition in which diffracted light by a diffraction grating appears, the formula (11) is known.

[Math. 11]

$$p \sin \theta = m\lambda \qquad \text{formula (11)}$$

In the formula (11), m is a diffraction order, λ is a wavelength of the diffracted light, p is an inter-vertex distance, and θ is an incidence angle of the incident light IL.

When the incident light angle θ is 90 degrees and the diffraction order m is 1, the wavelength λ is consistent with the inter-vertex distance p. Since the maximum wavelength of visible light is approximately 750 nm, diffracted light having the wavelength within the visible spectrum can be prevented from being emitted from the display 70 by setting the inter-vertex distance p as approximately 1 μm.

In an actual situation, however, the angle θ of light incident on the support layer 71 may be deviated from 90 degrees, or diffracted light of higher than the first order may be observed. For example, when the incident light angle θ is 15 degrees and the diffraction order m is 2, the inter-vertex distance p becomes approximately 6 μm. Accordingly, in order to prevent diffracted light emitted from the support layer 71 having no microparticle layer 72 from being observed, the inter-vertex distance p is more preferably 6 μm or more.

The microparticle layer 72 includes a plurality of layer elements, and the plurality of layer elements are composed of the first layer element 72a and the second layer element 72b. In the microparticle layer 72, the plurality of layer elements are arranged in one direction, and the periodicity with which the layer elements are arranged is 1 μm or more. An area of the layer element as viewed in a direction perpendicular to the two-dimensional plane in which the layer elements are arranged is preferably 2 μm square or more.

According to the display 70 described above, the microparticles 72g in sufficient number allowing for generation of structural colors, each of the microparticles 72g having a size capable of emitting light with structural color can be arranged in the respective layer elements.

[Example Shape of Support Layer]

Figure 23:
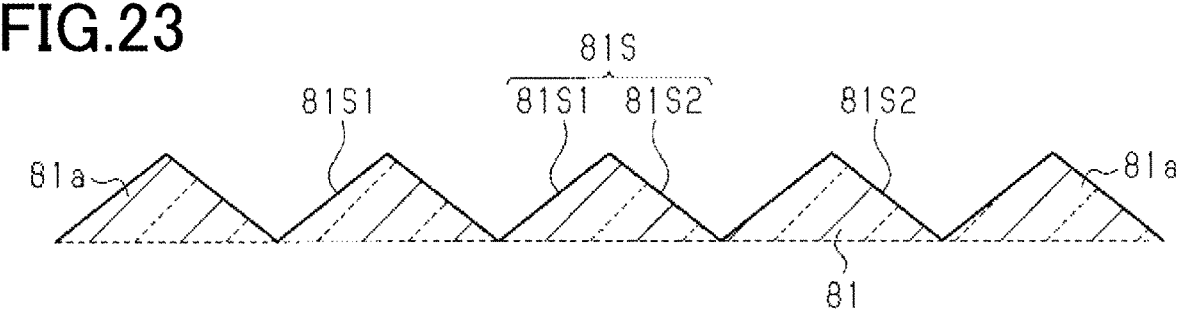
FIG. 23 is a partial cross-sectional view illustrating a partial cross-sectional structure of an example of a support layer.

With reference to FIGS. 23 to 26, an example of the shape of the support layer will be described. In the following description, four examples of the support layer having mutually different shapes will be described. In FIG. 23, for the purpose of illustrating light emitted outside the display via the support layer, the support layer is not hatched.

[First Shape]

As shown in FIG. 23, first support surfaces 81S1 and second support surfaces 81S2 are alternately arranged in one direction along a surface 81S of a support layer 81. The first support surface 81S1 and the second support surface 81S2 are the same in tilt angle to the horizontal direction, but different in two-dimensional plane in which the respective surfaces extend, that is, the direction in which they are oriented.

In other words, in the cross-section in the thickness direction of the display, the support layer 81 has a plurality of protrusions 81a having an isosceles triangle. In the cross-section of each protrusion 81a, two sides meeting at a vertex have the same length. That is, an angle formed between the direction of each side and the horizontal direction is a tilt angle, and the tilt angles of the respective sides are the same.

In the support layer 81, a vertical line extending through the vertex of the protrusion 81a is an axis of symmetry between the first support surface 81S1 and the second support surface 81S2. The microparticles arranged on the first support surface 81S1 and the microparticles arranged on the second support surface 81S2 are symmetrical about the axis of symmetry. The structural colors observed as the display is tilted in the direction in which the angle formed between the first support surface 81S1 and the vertical direction increases change in the same order as the structural colors observed as the display is tilted in the direction in which the angle formed between the second support surface 81S2 and the vertical direction increases.

[Second Shape]

Figure 24:
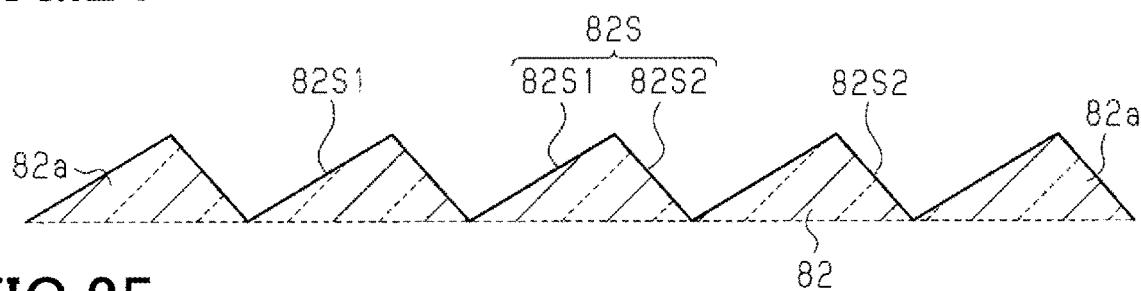
FIG. 24 is a partial cross-sectional view illustrating a partial cross-sectional structure of an example of a support layer.

As shown in FIG. 24, first support surfaces 82S1 and second support surfaces 82S2 are alternately arranged in one direction along a surface 81S of a support layer 82. The first support surface 81S1 and the second support surface 81S2 are different in two-dimensional plane in which they extend, more specifically, in their tilt angle to the horizontal direction and direction in which the respective surfaces are oriented.

In other words, in the cross-section in the thickness direction of the display, the support layer 82 includes a plurality of protrusions 82a having a triangular shape, and in the respective protrusions 82a, two sides meeting at a vertex have different tilt angles to the horizontal direction.

In the display having the support layer 82, the structural colors observed as the display is tilted in the direction in which the angle formed between the first support surface 82S1 and the axis extending in the vertical direction increases change in a different order from the structural colors observed as the display is tilted in the direction in which the angle formed between the second support surface 81S2 and the axis extending in the vertical direction increases. Moreover, the viewing zone in which reflected light is observed varies depending on the tilt angle of the surface 82S. Accordingly, if the display is tilted by the same angle in different directions, the zone in which structural colors are observed when the display is tilted in one direction differs from the zone in which structural colors are observed when the display is tilted in another direction.

Thus, since the regions emitting light from the microparticle layer and the wavelength of light can be changed depending on the shape of the surface 82S of the support layer 82, the display can be configured as below by using the shape of the surface 82S of the support layer 82. That is, the display can be configured such that a first design produced by the first layer elements on the first support surface 82S1 appears when the display is observed in the first observation direction, and a second design produced by the second layer elements on the second support surface 82S2 appears when the display is observed in the second observation direction. The display can be further configured such that a first design appears in red by making the first layer elements generate a structural color of red, and a second design appears in green by making the second layer elements generate a structural color of green.

[Third Shape]

Figure 25:
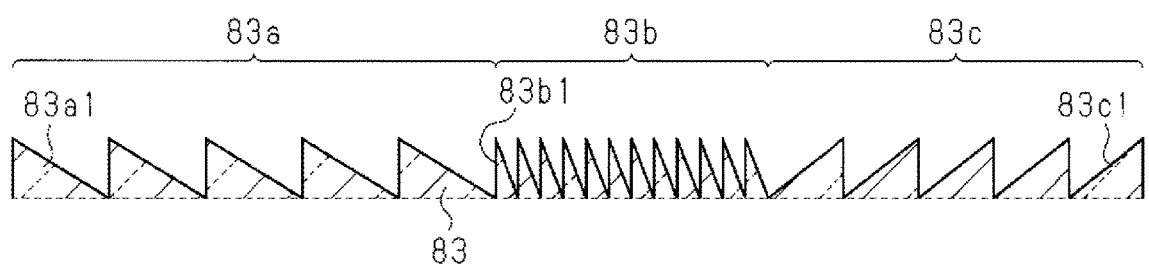
FIG. 25 is a partial cross-sectional view illustrating a partial cross-sectional structure of an example of a support layer.

As shown in FIG. 25, in the cross-section in the thickness direction of the display, the support layer 83 may include a first region 83a, a second region 83b, and a third region 83c arranged in one direction. The first region 83a includes a plurality of first protrusions 83a1, the second region 83b includes a plurality of second protrusions 83b1, and the third region 83c includes a plurality of third protrusions 83c1.

The first protrusions 83a1, the second protrusions 83b1, and the third protrusions 83c1 each have a right triangle, while the protrusions in three regions are different in direction of inclined side and in tilt angle of inclined side to the horizontal direction. In each region, a plurality of protrusions are arranged in one direction in each region.

Further, in the support layer 83, the first protrusions 83a1, the second protrusions 83b1, and the third protrusions 83c1 may be arranged in a regular order in one direction or an irregular order in one direction.

However, an observer cannot recognize any difference in color between the regions unless the regions of a single color are arranged at a resolution that can be visually recognized by the observer at a distance that the display is observed by the observer. Accordingly, when clearly different colors such as red and green are desired to be represented in adjacent regions, a plurality of microstructures of the respective colors are required to be arranged to form a certain area of the region.

The resolution of the human eye is approximately 100 μm to 200 μm when an object is observed at a distance of approximately 30 cm. Accordingly, when observed in a direction perpendicular to the direction in which the display extends, the region in which the microstructures are arranged to generate a single color preferably is at least 100 μm square.

[Fourth Form]

Figure 26:
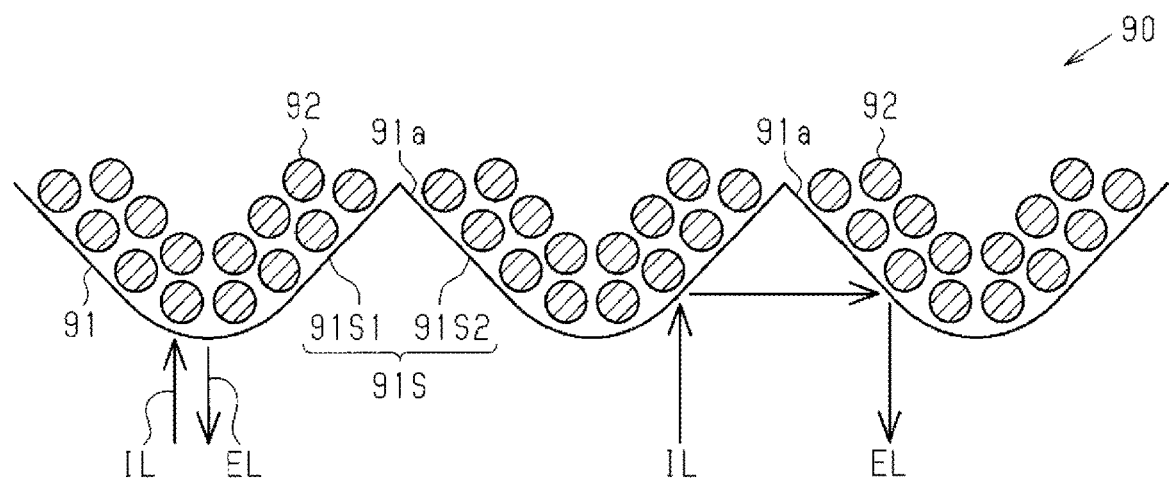
FIG. 26 is a partial cross-sectional view illustrating a partial cross-sectional structure of an example of the display.

As shown in FIG. 26, in a display 90, a surface 91S of a support layer 91 includes a first support surface 91S1 and a second support surface 91S2. The first support surface 91S1 and the second support surface 91S2 are different in direction in which they are oriented. In the cross-section in the thickness direction of the display 90, the first support surface 91S1 and the second support surface 91S2 form a protrusion 91a. The support layer 91 includes a plurality of protrusions 91a.

The first support surface 91S1 includes an inclined surface with a 45 degree tilt angle, and a curved surface having a curvature with a center of curvature located outside the support layer 91. The inclined surface and the curved surface are continuous in the direction in which the protrusions 91a are arrayed. Similarly, the second support surface 91S2 includes an inclined surface with a 45 degree tilt angle, and a curved surface having a curvature with a center of curvature located outside the support layer 91. The inclined surface and the curved surface are continuous in the direction in which the protrusions 91a are arrayed.

In each protrusion 91a, the inclined surface of the first support surface 91S1 and the inclined surface of the second support surface 91S2 form a vertex. In the direction in which the protrusions 91a are arrayed, a curved surface of the first support surface 91S1 in one of the protrusions 91a and a curved surface of the second support surface 91S2 in another protrusion 91a are continuous to form a bottom.

In the display 90 having the support layer 91 described above, when light is incident on the display 90 in the direction perpendicular to the direction in which the substrate extends, the incident light IL incident on the inclined surface of the second support surface 91S2 is reflected by the microparticle layer 92 toward the inclined surface of the first support surface 91S1 of the adjacent protrusion 91a. The light incident on the inclined surface of the first support surface 91S1 is then emitted as the emitted light EL by the microparticle layer 92 into the direction of incident light. On the other hand, the incident light IL incident on the bottom of the support layer 91 is reflected only once by the microparticle layer 92, and is emitted as the emitted light EL into the direction of incident light.

As described above, light reflected by a portion of the microparticle layer 92 that is in contact with the bottom of the support layer 91, and light reflected by a portion of the microparticle layer 92 that is in contact with the inclined surface of the first support surface 91S1 are different in the angle of light incident on the microparticle layer 92. Thus, since the interference condition varies between these two portions of the microparticle layer 92, the respective portions exhibit different structural colors. Further, although two structural colors are different colors in microscopic view, they are recognized as a mixed color of two structural colors from a position where the observer observes the display.

[Vertex Angle in Support Layer]

In the support layer, the angle at a vertex of the protrusion is a vertex angle. The smaller the vertex angle of the protrusion, the narrower the range of incidence angle of light at which a structural color can be observed when the display is observed, that is, light reflected by the microparticle layer formed on the support surface is emitted to the observer. In other words, the viewing zone is limited to a greater extent with a decrease in the vertex angle of the protrusion, leading to difficulty in observing structural color.

Moreover, even if the vertex angles are the same, the range of incidence angle of light described above varies depending on the shape of protrusion in the cross-section in the thickness direction of the display. For example, the inclined surface of a prism having a right triangular cross-sectional shape is the longest surface. In this case, a region in which reflected light is observed by the observer becomes largest. Therefore, when it is desired to increase a region of the display in which diffracted light can be visually observed, that is, when it is desired to decrease a region of the display that appears dark and to allow the almost entire display to appear bright, the support layer preferably includes protrusions with larger vertex angle.

As the vertex angle increases, the lower limit of the incident light angle $\theta$ in the formula (1) decreases. Further, in order to obtain reflected light having an optional wavelength and diffraction order m of 1 in the specific observation direction, an optimal material needs to be selected to obtain a predetermined value for the refractive index n or the inter-array plane distance d in the microparticle layer.

For example, when it is desired to obtain reflected light with 600 nm wavelength on the condition that the incident light angle $\theta$, that is, the light reflection angle $\theta$ is 30 degrees, a multiplied value of the refractive index n and the inter-array plane distance d is 600 from the formula (1). In the case where the microparticle layer is formed of close-packed colloidal crystals, that is, opal crystals, the refractive index n is a refractive index of the medium, and the inter-array plane distance d can be regarded as a particle diameter of the microparticle.

Accordingly, any of the combinations can be selected from a combination of a medium with the refractive index of 1 and microparticles with the particle diameter of 600 nm, a combination of a medium with the refractive index of 1.2 and microparticles with the particle diameter of 500 nm, and a combination of a medium with the refractive index of 1.5 and microparticles with the particle diameter of 400 nm. Accordingly, the reflected light with 600 nm wavelength can be obtained in a specific observation direction.

On the other hand, in the case where the microparticle layer is formed of non-close-packed colloidal crystals, the refractive index n and the inter-array plane distance d should be calculated taking into consideration the filling ratio and the electrostatic repulsion as described above.

[Other Configurations of Microparticle Layer]

Figure 27:
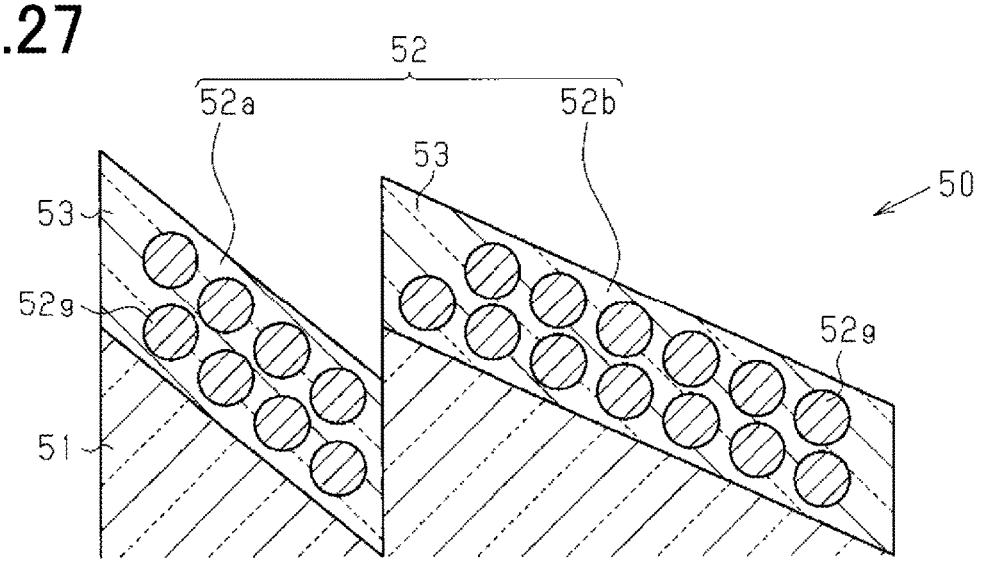
FIG. 27 is a partial cross-sectional view illustrating a partial cross-sectional structure of another configuration of the microparticle layer.

Referring to FIG. 27, other configurations of the microparticle layer will be described. In the following description, among the forms of the microparticle layer, the microparticle layer previously described with reference to FIG. 5 will be described. The configuration described below is also applicable to a microparticle layer having other forms.

As shown in FIG. 27, the display 50 may include a cover layer 53 that fills a space between a plurality of microparticles 52g and covers the entire microparticle layer 52. The cover layer 53 is light transparent, and a material for forming the cover layer 53 is, for example, a polymer gel.

Among the colloidal crystals described above, non-close-packed colloidal crystals have the microparticles 52g constituting the microparticle layer 52, which are spaced from each other in the microparticle layer 52. Accordingly, compared with opal crystals, bonding force between the microparticles 52g is weak so that the periodicity in arrangement of the microparticles in the microparticle layer 52 may be disordered due to vibration or the like applied to the colloidal crystal.

Therefore, in order to use colloidal crystals as the microparticle layer 52 of the display 50 with the periodicity in arrangement of the microparticles 52g being maintained, the crystal structure of the colloidal crystal is preferably fixed in position by the cover layer 53.

A material for forming the cover layer 53 is, for example, a polymer gel which is fixed by being irradiated with ultraviolet light, and the polymer gel may include polyacrylamide, gelatin, polyethylene glycol, and the like. Further, since the cover layer 53 is light transparent, natural light or light from a light source such as fluorescent light can be incident on the microparticle layer 52 and emitted from the microparticle layer 52.

In selection of a material for forming the cover layer 53, the difference between the refractive index of the microparticle 52g and the refractive index of the cover layer 53 should be noted. When the difference between these refractive indices is small, the amount of light diffracted by the microparticles 52g into the cover layer 53 decreases, leading to difficulty in visual observation of structural colors. Accordingly, the difference between these refractive indices is preferably 0.02 or more.

On the other hand, among resins that are generally available, the refractive index of the resin with a relatively high refractive index is approximately 1.7. Further, assuming that a possible minimum refractive index of the microparticle 52g is a refractive index of air of 1.0, the difference between the refractive index of the microparticle 52g and the refractive index of the cover layer 53 is at most approximately 0.7.

Since the refractive indices of silica microparticles and polystyrene microparticles that can be used as the microparticles 52g are 1.4 or more, the difference between the refractive index of the microparticle 52g and the refractive index of the cover layer 53 is substantially at most approximately 0.3. For these reasons, in formation of the cover layer 53 covering the microparticle 52g, a material for forming the microparticles 52g and a material for forming the cover layer 53 can be selected such that difference between the refractive index of the microparticle 52g and the refractive index of the cover layer 53 falls within the range of 0.02 or more and 0.7 or less.

[Planar Structure of Display]

Figure 28:
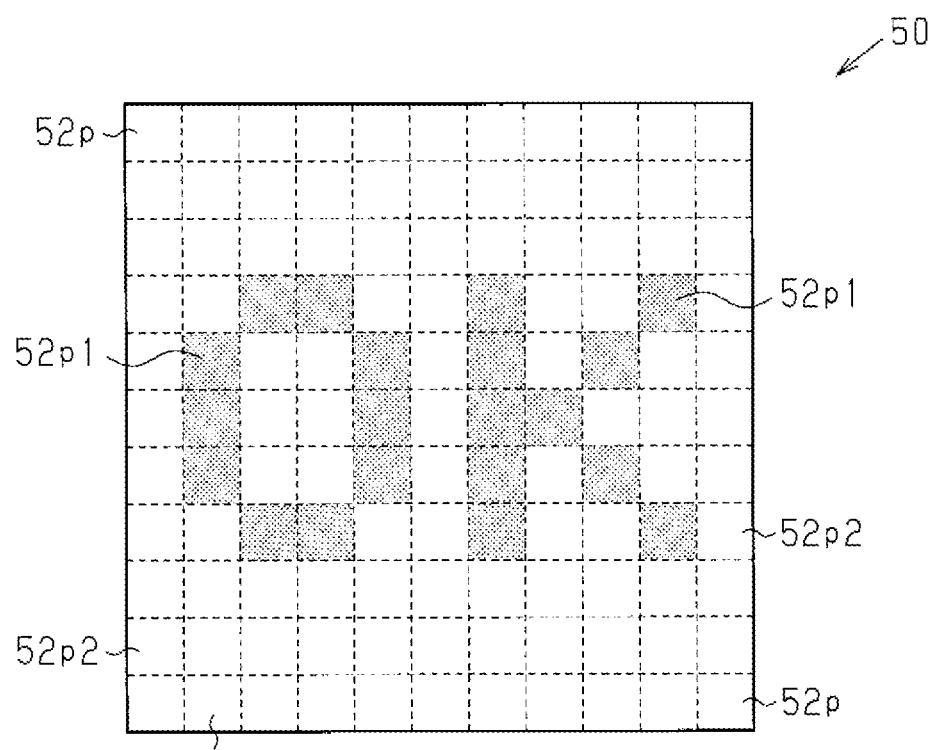
FIG. 28 is a plan view illustrating a planar structure of the display as viewed in a direction perpendicular to a two-dimensional plane in which the microparticle layer extends.

With reference to FIG. 28, the planar structure of the display will be described. In the following description, among the forms of the display, the display previously described with reference to FIG. 20 will be described. Further, the configuration described below is also applicable to the display having other forms.

As shown in FIG. 28, a plurality of pixels 52p are arranged in the microparticle layer 52 as viewed in a direction perpendicular to the two-dimensional plane in which the microparticle layer 52 extends. The display 50 including the microparticle layer 52 has a rectangular shape as viewed in a direction perpendicular to the two-dimensional plane in which the microparticle layer 52 extends. In the plurality of pixels 52p arranged in the microparticle layer 52, each pixel 52p has a rectangular shape such that the shape of one pixel 52p is the same as that of the other pixels 52p. The plurality of pixels 52p are arranged in a first direction and another direction perpendicular to the first direction. Each pixel 52p has a size in the range of, for example, 100 μm square or more and 300 μm square or less.

The microparticle layer 52 includes a plurality of first layer elements 52a and a plurality of second layer elements 52b. The plurality of pixels 52p are composed of a plurality of first pixels 52p1 and a plurality of second pixels 52p2. Among these pixels, the first pixels 52p1 are composed of the plurality of first layer elements 52a, while the second pixels 52p2 are composed of the plurality of second layer elements 52b.

Accordingly, since a color of the first pixel 52p1 and a color of the second pixel 52p2 are different from each other when observed in a specific observation direction, an image displayed by the display 50 is formed of a portion displayed by the plurality of first pixels 52p1 and a portion displayed by the plurality of second pixels 52p2.

As viewed in a direction perpendicular to the two-dimensional plane in which the microparticle layer 52 extends, the plurality of first pixels 52p1 of the plurality of pixels 52p are arranged to display an image of alphabetic characters "O" and "K," and the plurality of second pixels 52p2 are arranged to fill a gap between the adjacent first pixels 52p1. Accordingly, the display 50 can display an image composed of alphabetic characters "O" and "K" and a background of these characters.

[Articles]

Figure 29:
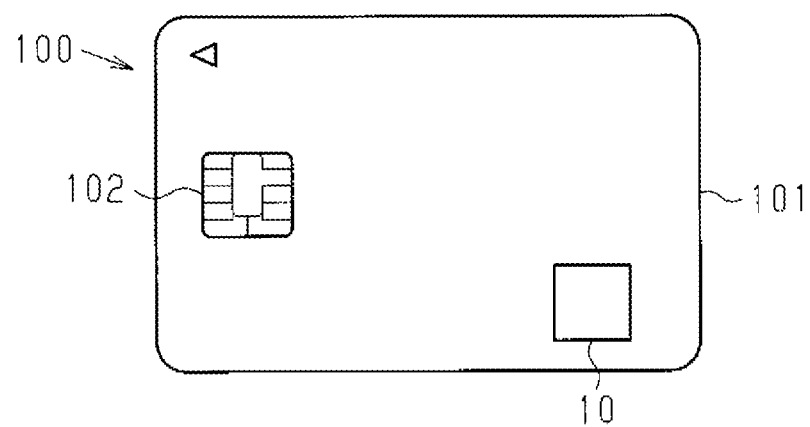
FIG. 29 is a plan view illustrating a planar structure of an embodiment that embodies an article.

With reference to FIG. 29, an example of an article having the display 10 will be described. In the following description, an IC card will be described as an example of the article. As shown in FIG. 29, an IC card 100 includes a substrate 101, an IC chip 102, and the display 10. As viewed in a direction perpendicular to the plane in which the substrate 101 extends, the IC chip 102 and the display 10 are positioned on one surface of the substrate 101.

[Method of Forming Microparticle Layer]

A method for forming colloidal crystals constituting the microparticle layer will be described. In the following description, a method for forming close-packed opal crystals in the colloidal crystals and a method for forming non-close-packed colloidal crystals will be sequentially described.

Most typical methods known in the art for forming opal crystals are methods using self-assembly of microparticles by a coagulation process. A precipitation method is a known technique for the above forming method. In the precipitation method, a plurality of colloidal microparticles having uniform particle diameter and small surface electric charge are dispersed in a dispersion medium so that the microparticles are arrayed after they precipitate due to gravity or arrayed by evaporating the dispersion medium.

In the precipitation method, when the particle diameter of microparticles is 500 nm or less and when the specific gravity of colloidal microparticle and the specific gravity of dispersion medium are approximately the same, a dispersion state of the microparticles is an equilibrium state, whereby the colloidal microparticles are not crystalized. Thus, in the precipitation method, it is difficult to determine an optimal condition since various factors such as particle diameter of colloidal microparticle, difference in specific gravities of colloidal microparticle and dispersion medium, temperature of reaction system, and evaporation speed of dispersion medium have an effect on crystallization of colloidal microparticles.

Other known methods include methods using physical restriction. Examples of such methods include an advection aggregation method using a capillary force applied between colloidal microparticles at the gas-liquid interface, a pulling-up method developed from the advection aggregation method, and an electrophoresis method. In opal crystals, microparticles are arrayed while being in contact with other. Accordingly, if particle diameters of the colloidal microparticles used for forming a colloidal crystals are not uniform, the colloidal microparticles are disordered in arrangement and the colloidal crystals tend to induce occurrence of cracks in the process of drying the dispersion medium.

On the other hand, in non-close-packed colloidal crystals, colloidal microparticles having surface electric charges are dispersed in liquid such that the colloidal microparticles are periodically arrayed by electrostatic repulsion. In non-close-packed colloidal crystals, colloidal microparticles are crystalized while being spaced from each other. Accordingly, disorder in arrangement of colloidal microparticles due to non-uniform particle diameters is mitigated. Such crystals are known as charged colloidal crystals. Since colloidal microparticles are randomly distributed if a repulsive force between colloidal microparticles is weak, a high repulsive force is necessary for periodic arrangement of colloidal microparticles.

In order to increase electrostatic repulsion between colloidal microparticles, it is effective to increase the concentration of colloidal microparticles in a dispersion medium, ion concentration, and pH. For example, although a plurality of silanol groups (Si—OH) are attached on a surface of silica microparticles, which are commonly used in production of colloidal crystals, the charge number of the surface is small since only part of the silanol groups are dissociated in pure water. Accordingly, when an alkali such as sodium hydroxide (NaOH) is added to a dispersion medium, dissociation of silanol groups proceeds, causing an increase in the charge number.

In general, variation in particle diameter of microparticles is required to be 10% or less to form a colloidal crystal. Examples of microparticles that can be prepared to satisfy this condition include silica (SiO2) microparticles, polystyrene (PSt) microparticles, and polymethylmethacrylate (PMMA) microparticles. Further, since silica, polystyrene, and polymethylmethacrylate are relatively large in specific gravity, these materials are effective in formation of close-packed colloidal crystals by the precipitation method.

[Method of Forming Support Layer]

The support layer having the above shapes can be formed by using the method described below.

In formation of the support layer, an original plate for forming a support layer is first prepared. The original plate can be formed by, for example, photolithography. In formation of an original plate by photolithography, a substrate such as a glass substrate is first prepared, and a photosensitive resist is applied on one surface of the substrate. Then, a desired region of a photosensitive resist is exposed to light by using an electron beam or laser, and the photosensitive resist after exposure is developed to thereby form a resist pattern.

The photosensitive resist may be either a positive resist in which a portion of the photosensitive resist exposed to light becomes soluble during development or a negative resist in which a portion of the photosensitive resist unexposed to light becomes soluble during development. Then, a resist pattern can be designed according to the resist material selected.

A substrate having a resist pattern can be used as an original plate, or a stamp, for forming a support layer on a film or the like. However, since a resist pattern is fragile, it is not suitable for mass production stamps. Accordingly, a metal stamp may be formed from this substrate by using electrocasting or the like. In electrocasting, a substrate is immersed in an electrolytic solution so that metal ions precipitated by electrolysis are electrodeposited on the surface of the substrate. Electrocasting can almost completely reproduce a patterned structure of the substrate to thereby fabricate a stamp as a replication of features not more than 1 μm thick.

Since electrocasting is a technique by which metal ions are electrodeposited on the surface of the substrate as described above, the substrate is required to have electrical conductivity. Typically, photosensitive resists do not have electrical conductivity. Accordingly, it is required to form a metal thin film by sputtering, vacuum vapor deposition, or the like on the surface of a photosensitive resist before electrocasting is performed onto the substrate.

Then, a metal stamp formed by electrocasting is used as an original plate to transfer a micropatterned structure of the original plate onto a material for forming a support layer. In transfer of the patterned structure, a substrate made of polyethylene terephthalate (PET), polycarbonate (PC), or the like is first prepared, and a thermoplastic resin or photocurable resin is applied on one surface of the substrate. Then, while the metal stamp is pressed against the surface of the resin applied on the substrate, the resin is exposed to heat or light for curing. After that, the metal stamp is removed from the resin.

Transfer can be performed by using techniques such as step-and-repeat and roll-to-roll. In the step-and-repeat method, a stamp and a resin are positioned parallel, and the entire surface of the stamp is pressed against the resin at once. Accordingly, as the area of the stamp pressed against the resin increases, the entire surface of the stamp is less likely to be subjected to a uniform pressure, which leads to the entry of air bubbles between the stamp and the resin.

On the other hand, in the roll-to-roll method, a linear pressure is applied to resin by rotating a metal roll around which a stamp is wound. Accordingly, a uniform pressure can be applied to the resin compared with the step-and-repeat method. In the roll-to-roll method, a patterned structure can be continuously transferred onto a resin sheet by repeatedly rotating a roll. Therefore, the roll-to-roll method is suitable for mass production.

As described above, according to an embodiment of the display and article, the following advantageous effects can be obtained.

(1) The wavelength of light emitted from the first layer element in the observation direction OD and the wavelength of light emitted from the second layer element in the observation direction OD are different from each other. Accordingly, compared with the configuration in which light emitted from one microparticle layer into the observation direction OD has a uniform wavelength, light emitted from the microparticle layer has various wavelengths. As a result, the designability of an image displayed by the display can be improved.

(2) The first distance D1 and the second distance D2 of the first layer element and the second layer element, respectively, can be different from each other by forming a microparticle layer across the surface of the support layer.

(3) According to a configuration in which the first layer element and the second layer element are different in the direction in which the particle array plane is oriented, the angles formed between the particle array planes and the directions of light emitted from the particle array planes can be different from each other. Accordingly, the wavelength of light emitted from the first layer elements and the wavelength of light emitted from the second layer elements can be different from each other.

(4) According to a configuration in which the respective layer elements include a plurality of microparticle array planes, the intensity of diffracted light emitted from the respective layer elements can be increased compared with a configuration in which the respective layer elements include only one microparticle array plane.

(5) The two-dimensional plane in which the first layer element 62a extends and the two-dimensional plane in which the second layer element 62b may intersect with each other, and the two-dimensional plane in which the first layer element 62a extends and the two-dimensional plane in which the particle array plane 62s1 extends may be parallel with each other in the first layer element 62a, and the two-dimensional plane in which the second layer element 62b extends and the two-dimensional plane in which the particle array plane 62s2 extends may intersect with each other in the second layer element 62b. According to this configuration, the angle formed between the first layer element 62a and the second layer element 62b and the angle formed between the particle array plane 62s1 in the first layer element 62a and the particle array plane 62s2 in the second layer element 62b may be different from each other.

(6) When a plurality of microparticles have an average particle diameter in the range of 0.1 μm or more and 1 μm or less, the wavelength of the first diffracted light or the second diffracted light emitted from the microparticle layer is likely to fall within the visible light region.

(7) When the periodicity in arrangement of the layer elements is 1 μm or more and the layer elements have an area of 2 μm square or more as viewed in the direction perpendicular to the two-dimensional plane in which the layer element extends, microparticles in sufficient number allowing for generation of structural colors, each of the microparticles having a size capable of emitting light with structural color, can be arranged in the respective layer elements.

(8) When a difference between the refractive index of the microparticle 52g and the refractive index of the cover layer 53 is in the range of 0.02 or more and 0.7 or less, the light intensity of diffracted light emitted by the display 50 tends to be increased so that the light can be visually observed.

(9) According to a configuration in which the plurality of first pixels 52p1 include the first layer element 52a, a predetermined image can be formed by the light emitted from the first layer elements 52a in the plurality of first pixels 52p1.

Furthermore, the aforementioned embodiments can be appropriately modified as described below.

The first layer element and the second layer element may be different from each other in curvature such that the first layer element and the second layer element are different from each other in at least one of (b) the two-dimensional plane in which the layer element extends and (c) the two-dimensional plane in which the particle array plane extends. Further, a surface having curvature, that is, a curved surface, is composed of a group of a plurality of surfaces, each of which can exhibit a structural color, and the plurality of surfaces can each exhibit structural colors different from each other. The surfaces having different curvatures have different surfaces constituting the respective surfaces.

According to the aforementioned configurations, the following advantageous effects are obtained.

(10) The first layer element and the second layer element may be different in at least one of the two-dimensional plane in which the layer element extends and the two-dimensional plane in which the particle array plane extends due to a difference in the curvature of the first layer element and the curvature of the second layer element. As a result, the wavelength of light emitted from the first layer element and the wavelength of light emitted from the second layer element may be different.

In the display 60 previously described with reference to FIG. 6, the direction in which the first layer element 62a is oriented and the direction in which the second layer element 62b is oriented are different from each other, while the tilt angle α of the first layer element 62a and tilt angle θ of the second layer element 62b are the same. With this configuration as well, the advantageous effect similar to the above (1) can be obtained when the first layer element 62a and the second layer element 62b are different from each other in the two-dimensional plane in which the particle array plane extends and thus the first distance D1 and the second distance D2 are different from each other.

Although the protrusion of the support layer is described as a protrusion having a triangular cross-section in the thickness direction of the display, the protrusion may have any shape such as a semicircle, ellipse, and a rectangle in the cross-section in the thickness direction of the display. In other words, the support layer may have any shape as long as the first distance D1 and the second distance D2 are different from each other due to a difference in at least one of (b) the two-dimensional plane in which the layer element extends and (c) the two-dimensional plane in which the particle array plane extends between the first layer elements and the second layer elements located along the surface of the support layer.

The display 50 having a plurality of pixels 52p may be configured to display any image such as numbers, symbols, and figures as well as the alphabetic characters described above, and may also be configured to display two or more images.

The article having the display may be various cards other than IC cards, magnetic cards, wireless cards, and identification (ID) cards. Alternatively, the article may be negotiable securities such as gift certificates, banknotes, or luxury products such as art works. Moreover, the articles may be a tag attached to a product to be confirmed as being authentic, or may be a package or a portion of a package accommodating an article to be confirmed as being authentic.

As described above, according to the third embodiment and modifications thereof, technical ideas described in [Supplementary Note 4] to [Supplementary Note 14] can be obtained.

[Supplementary Note 4]

A Display including:

a microparticle layer having a first layer element and a second layer element; and a support layer, wherein the first layer element and the second layer element are disposed on the support layer, the first layer element has a plurality of first particle array planes which generate a structural color, each of the first particle array planes are phantom planes that extend in a direction parallel with the first layer element, and a plurality of first microparticles are periodically arranged on the respective first particle array planes with the center of the first microparticles being located on the first particle array plane, the second layer element has a plurality of second particle array planes which generate a structural color, each of the second particle array planes are phantom planes that extend in a direction parallel with the second layer element, and a plurality of second microparticles are periodically arranged on the respective second particle array planes with the center of the second microparticles being located on the second particle array plane, a distance between the first particle array planes in the observation direction is a first distance, a distance between the second particle array planes in the observation direction is a second distance, and the first distance and the second distance are different from each other in at least one of (a) the center distance between the microparticles in the thickness direction of the layer element, (b) the two-dimensional plane in which the layer elements extend, (c) the two-dimensional plane in which the particle array plane extends, and (d) the arrangement of the microparticles in the particle array plane such that the first distance and the second distance are different from each other.

According to the configuration of the above [Supplementary Note 4], the wavelength of light emitted from the first layer element in the observation direction and the wavelength of light emitted from the second layer element in the observation direction are different from each other.

Accordingly, compared with the configuration in which light emitted from one microparticle layer in the observation direction has a uniform wavelength, light emitted from the microparticle layer has various wavelengths. As a result, the designability of an image displayed by the display can be improved.

[Supplementary Note 5]

The display according to the Supplementary Note 4, further including a support layer supporting the microparticle layer, wherein the surface includes a first support surface supporting the first layer element, and a second support surface supporting the second layer element, and the first distance and the second distance are different from each other in at least one of (b) the two-dimensional plane in which the layer elements extend, and (c) the two-dimensional plane in which the particle array plane extends such that the two-dimensional plane in which the first support surface extends and the two-dimensional plane in which the second support surface extends are different from each other.

According to the configuration of the above Supplementary Note 5, the first distance and the second distance of the first layer element and the second layer element, respectively, can be different from each other by forming a microparticle layer across the surface of the support layer.

[Supplementary Note 6]

The display according to the Supplementary Note 4 or 5, wherein the direction in which the first particle array plane is oriented and the direction in which the second particle array plane is oriented are different from each other.

According to the above configuration, since the first layer element and the second layer element are different in the direction in which the particle array plane is oriented, the angles formed between the particle array planes and the directions of light emitted from the particle array planes can be different from each other. Accordingly, the wavelength of light emitted from the first layer elements and the wavelength of light emitted from the second layer elements can be different from each other.

[Supplementary Note 7]

The display according to any one of the Supplementary Notes 4 to 6, wherein a curvature of the surface supporting the first layer element, and a curvature of the surface supporting the second layer element are different from each other such that the first layer element and the second layer element are different from each other in at least one of (b) the two-dimensional plane in which the layer elements extend, and (c) the two-dimensional plane in which the particle array plane extends.

According to the above configuration, the first layer element and the second layer element may be different in at least one of the two-dimensional plane in which the layer element extends and the two-dimensional plane in which the particle array plane extends due to a difference in the curvature of the first layer element and the curvature of the second layer element. As a result, the wavelength of light emitted from the first layer element and the wavelength of light emitted from the second layer element may be different.

[Supplementary Note 8]

The display according to any one of the Supplementary Notes 4 to 7, wherein the first layer element and the second layer element intersect with each other, the two-dimensional plane in which the first layer element extends and the two-dimensional plane in which the particle array plane extends are parallel with each other in the first layer element, and the two-dimensional plane in which the second layer element extends and the two-dimensional plane in which the particle array plane extends intersect with each other in the second layer element.

According to the configuration of the above Supplementary Note 8, the angle formed between the first layer element and the second layer element and the angle formed between the particle array plane in the first layer element and the particle array plane in the second layer element may be different from each other.

[Supplementary Note 9]

The display according to any one of the Supplementary Notes 4 to 8, wherein the respective microparticles have a spherical shape, and the average particle diameter of the plurality of microparticles is in the range of 0.1 µm or more and 1 µm or less.

According to the configuration of the above Supplementary Note 10, the wavelength of the first diffracted light or the second diffracted light emitted from the microparticle layer is likely to fall within the visible light region.

[Supplementary Note 10]

A display according to the Supplementary Note 9, wherein the first layer element and the second layer element are periodic elements, a pitch of the periodic elements on the support layer is 1 µm or more, and an area of the periodic elements as viewed in a direction perpendicular to the support layer is 2 µm square or more.

According to the configuration of the above Supplementary Note 10, microparticles in sufficient number allowing for generation of structural colors, each of the microparticles having a size capable of emitting light with structural color, can be arranged in the respective layer elements.

[Supplementary Note 11]

The display according to any one of the Supplementary Notes 4 to 10, further including a cover layer which is light transparent and fills a space between the plurality of microparticles and covers the microparticle layer, wherein a difference between the refractive index of the microparticle and the refractive index of the cover layer is in the range of 0.02 or more and 0.7 or less.

According to the configuration of the above Supplementary Note 11, the light intensity of diffracted light emitted by the display tends to be increased so that the light can be visually observed.

[Supplementary Note 12]

The display according to any one of the Supplementary Notes 4 to 11, wherein a plurality of pixels are arranged in the microparticle layer, and the respective pixels include the first layer element.

According to the configuration of the above Supplementary Note 12, a predetermined image can be formed by the light emitted from the first layer elements in the plurality of pixels.

[Supplementary Note 13]

An article including a display, wherein the display is the display according to any one of the Supplementary Notes 1 to 12.

REFERENCE SIGNS LIST

α . . . Incidence angle; β . . . Diffraction angle; λ . . . Specific wavelength; H . . . Height; L . . . Bent line; θb . . . Tilt angle; BL . . . Lattice; DK . . . Specific direction; L1 . . . Incident light; L2 . . . Diffracted light; θb1, θb2 . . . Tilt angle; θbx . . . First tilt angle; θby . . . Second tilt angle; L1E . . . Unit lattice; PIC, PICA, PICB . . . Image; SPT . . . Repeated pitch; PIC1 . . . First image; PIC2 . . . Superimposed image; 1PT . . . First pitch; 2PT . . . Second pitch; 10, 20, 50, 60, 70, 90 . . . Display; 10S, 20S . . . Display surface; 11A, 11l, 52p . . . Pixel; 11K, 21K . . . Phantom plane; 21M . . . Superimposed pixel; 11S . . . Unit reflecting surface; 11S1 . . . Surface element; 21AO . . . display area; 21Kx . . . First phantom plane; 21Ky . . . Second phantom plane; 21N . . . Single-plane pixel; 21SA . . . First unit reflecting surface; 21SB . . . Second unit reflecting surface; 21SC . . . Third unit reflecting surface; 21SD . . . Fourth unit reflecting surface; 21ST . . . Bent surface; 21SG . . . Recess; 21Sx . . . First surface element; 21Sy . . . Second surface element; 21TG . . . Projection; 110, 101 . . . Substrate; 112, 51, 61, 71, 81, 82, 83, 91 . . . Support layer; 112S, 51S, 61S, 71S, 81S, 82S, 91S . . . Surface; 113, 210, 52, 62, 72, 92 . . . Microparticle layer; 113a, 52a, 62a, 72a . . . First layer element; 113b, 52b, 62b, 72b . . . Second layer element; 113g, 211, 52g, 62g, 72g . . . Microparticle; 113s, 212, 52s, 62s1, 62s2, 72s . . . Particle array plane; 30 . . . Face-centered cubic lattice; 31, 41 . . . First array plane; 32, 42 . . . Second array plane; 40 . . . Body-centered cubic lattice; 51S1, 61S1, 71S1, 81S1, 82S1, 91S1 . . . First support surface; 51S2, 61S2, 71S2, 81S2, 82S2, 91S2 . . . Second support surface; 52p1 . . . First pixel; 52p2 . . . Second pixel; 53 . . . Coating layer; 72t . . . Vertex; 81a, 82a, 91a . . . Protrusion; 83a . . . First region; 83a1 . . . First protrusion; 83b . . . Second region; 83b1 . . . Second protrusion; 83c . . . Third region; 83c1 . . . Third protrusion; 100 . . . IC card; 102 . . . IC chip.

What is claimed is:

1. A display comprising:
a plurality of pixels arrayed in a matrix,
wherein each of the pixels has a pixel unit, and the pixel unit has a single unit reflecting surface, and
wherein all the unit reflecting surfaces include unit reflecting surfaces that allow light incident in a predetermined direction to be reflected in a direction predefined for the respective unit reflecting surfaces, so that light reflected by all the unit reflecting surfaces forms an image which appears in a specific direction, which is a direction common to all the unit reflecting surfaces, the image is a first image,
the unit reflecting surface is a first unit reflecting surface,
the specific direction is a first specific direction,
among all the pixels, a plurality of superimposed pixels are included,
each of the superimposed pixels further includes a single second unit reflecting surface,
among all the second unit reflecting surfaces, second unit reflecting surfaces that allow light incident in a predetermined direction to be reflected in a direction predefined for the respective second unit reflecting surfaces are included, so that light reflected by all the second unit reflecting surfaces forms an image which appears in a second specific direction, which is a direction common to all the second unit reflecting surfaces;
all the pixels are arranged in a matrix in a plane,
in at least first unit reflecting surface, the first unit reflecting surface includes a plurality of first surface elements which are arranged spaced from each other in a first phantom plane so that a surface of each first surface element of said plurality is parallel to the first phantom surface,
the second unit reflecting surface includes a plurality of second surface elements which are arranged spaced from each other in a second phantom plane so that a surface of each second surface element of said plurality is parallel to the second phantom plane,
surfaces of each surface element of the plurality of first surface elements and the plurality of second surface elements extend in a first direction;
the first surface elements and the second surface elements are alternately arranged in an arrangement direction, which is different from the first direction, as viewed in a direction facing the plane on which the pixels are arrayed, and
an angle formed between the plane on which the pixels are arrayed and the first phantom plane and an angle formed between the plane on which the pixels are arrayed and the second phantom plane are different from each other.

2. The display of claim 1, wherein the plurality of first surface elements allow light having a wavelength predefined for the unit reflecting surface and incident on the unit reflecting surface in a direction predefined for the unit reflecting surface to be diffracted in the specific direction.

3. The display of claim 1, wherein
the plurality of second surface elements allow light having a wavelength predefined for the second unit reflecting surface and incident on the second unit reflecting surface in a direction predefined for the second unit reflecting surface to be diffracted in the second specific direction.

4. The display of claim 1, wherein each pixel consists of the plurality of the first surface elements and the plurality of the second surface elements.

* * * * *